United States Patent
Craig et al.

[11] Patent Number: 5,227,643
[45] Date of Patent: Jul. 13, 1993

[54] BARCODE IDENTIFICATION SYSTEM

[75] Inventors: Gina M. Craig; Dale E. Lamprecht, Jr.; Debra A. Stellwag, all of Dayton; Thomas R. Wagner, Fairfield, all of Ohio

[73] Assignee: Monarch Marking Systems, Inc., Dayton, Ohio

[21] Appl. No.: 783,770

[22] Filed: Oct. 28, 1991

[51] Int. Cl.$^5$ .............................................. G06K 7/10
[52] U.S. Cl. ..................................... 250/566; 235/492
[58] Field of Search ................. 250/556, 566; 346/23; 235/462

[56] References Cited

U.S. PATENT DOCUMENTS

| | | | |
|---|---|---|---|
| 4,660,221 | 4/1987 | Dlugos | 235/462 |
| 5,034,985 | 7/1991 | Keogh | 235/462 |

Primary Examiner—David C. Nelms
Assistant Examiner—K. Shami
Attorney, Agent, or Firm—McAndrews, Held & Malloy, Ltd.

[57] ABSTRACT

A barcode identification system is shown that includes a user operable personal computer for creating print jobs. The personal computer is coupled to a number of printers for printing the data for a job in a selected format on a record member such as a tag, label or the like. The system employs modular software. During the initialization of each of the software modules, the system determines whether the module includes a key identification that matches a system key and if not, the operation of the software module is limited to a demonstration mode if that mode is allowable. A data entry routine aids the user entering valid data for a selected format. In response to a print command, the data entered by the user is combined with the selected format to form a job. The job is then sent to a spooler which distributes the job to one of the barcode printers of the system.

19 Claims, 25 Drawing Sheets

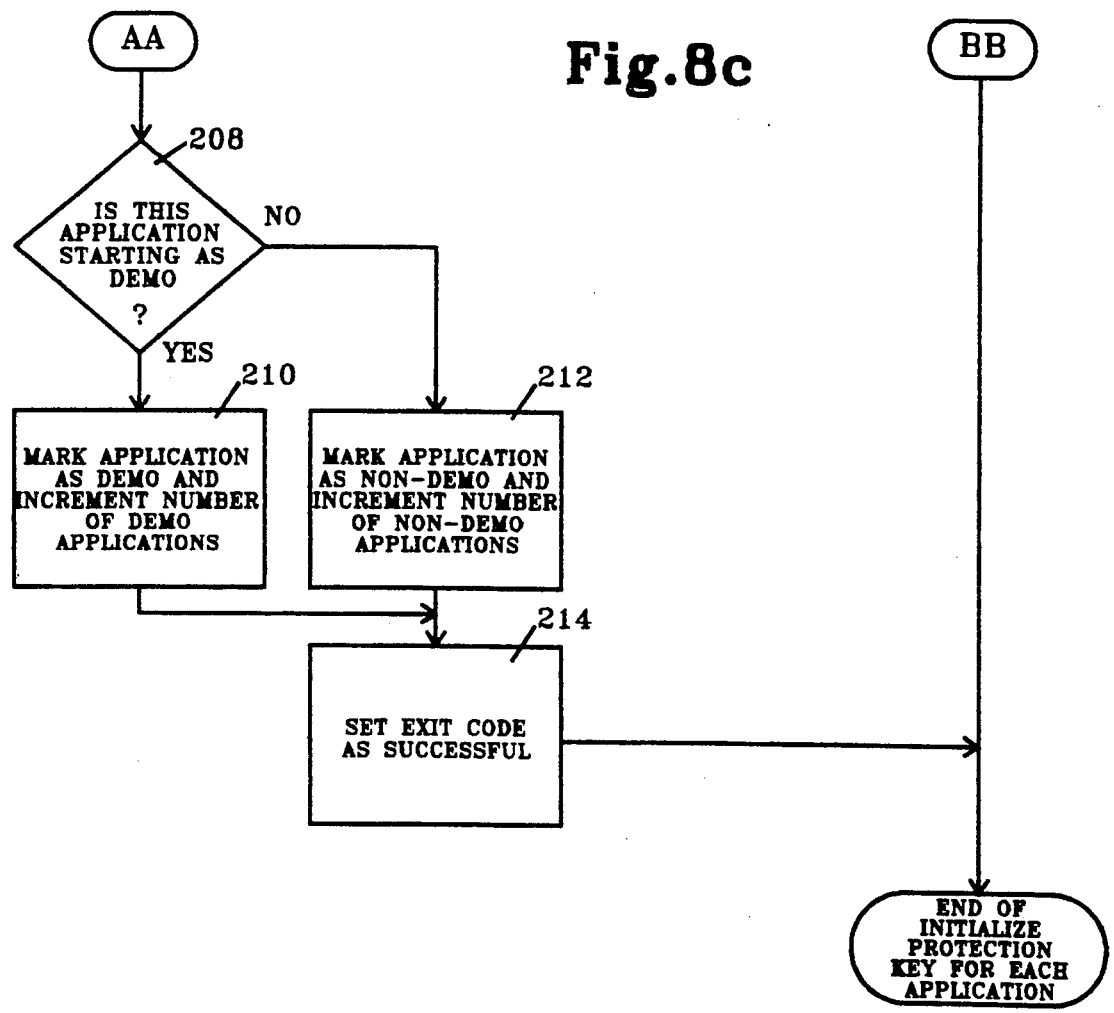

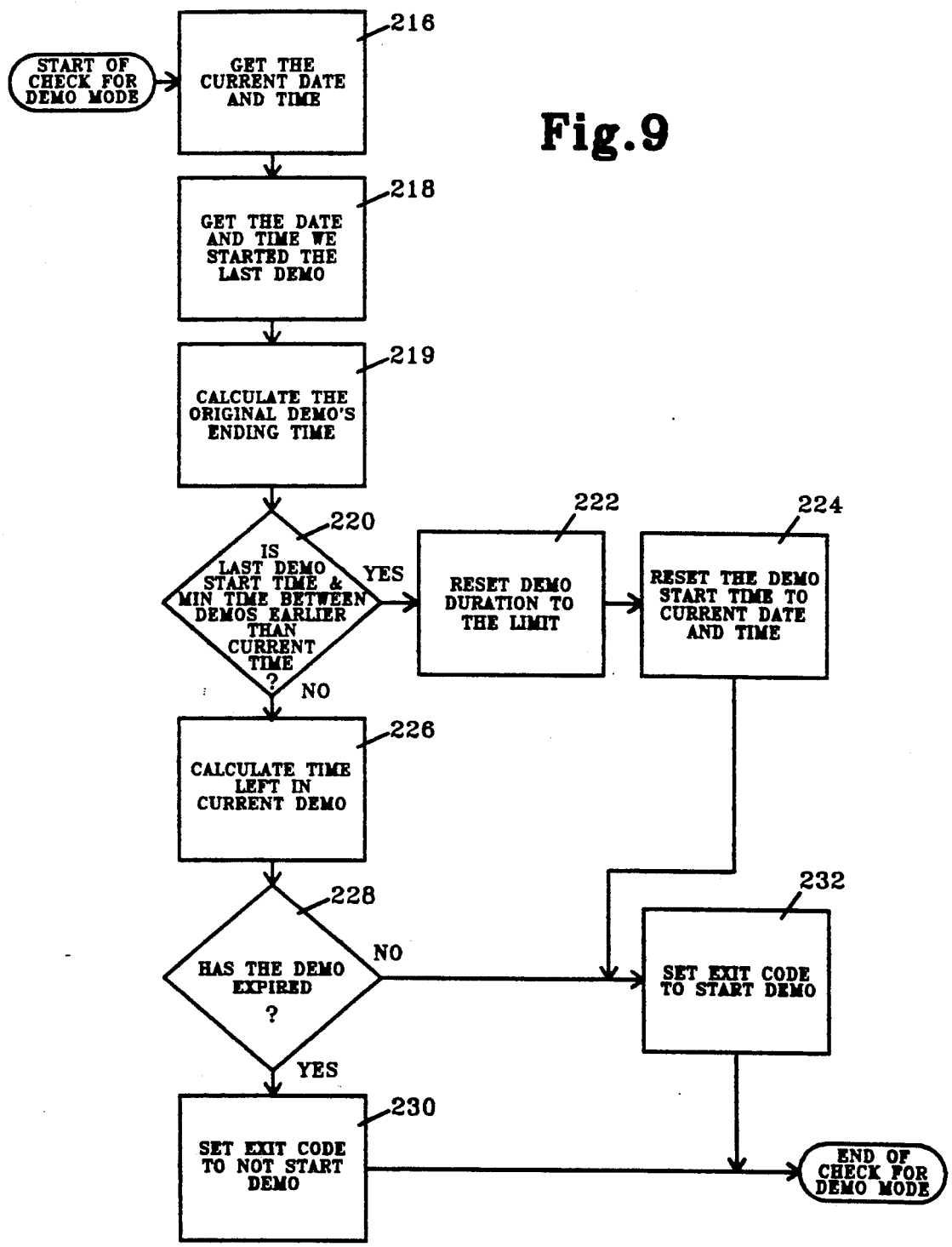

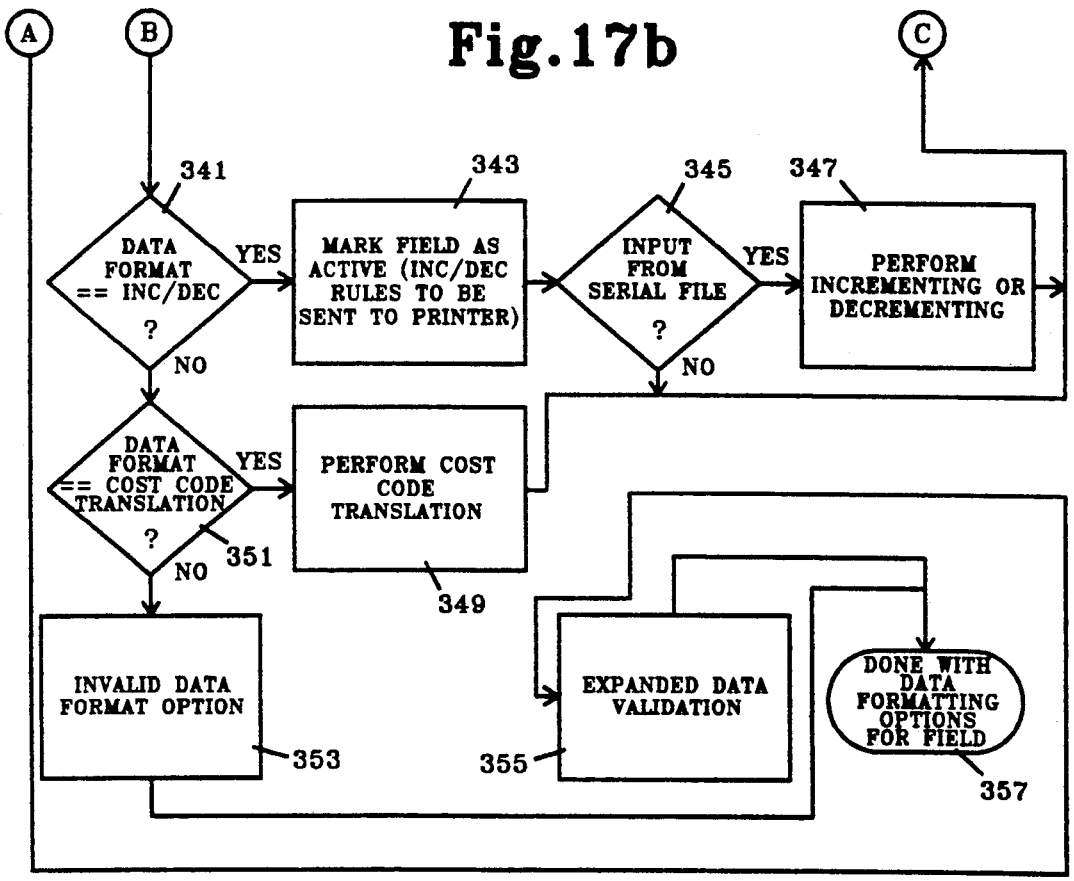

5,227,643

BARCODE IDENTIFICATION SYSTEM

TECHNICAL FIELD

The present invention is directed to a barcode identification system that includes a number of software modules to control the operation thereof, the system as well as each software module being key protected; and more particularly to such a system that includes a data entry module to aid the user in entering valid data to be printed in accordance with a selected format on a tag, label or the like.

BACKGROUND OF THE INVENTION

Barcode identification systems are known for printing jobs that include barcodes and associated alphanumeric characters on a web of record members such as tags, labels or the like. Known barcode information systems typically are not modular in nature in that the systems require a fixed number of software routines for controlling data entry, format creation, etc. Because the systems are not modular, if a user does not want to create his own formats for example, the user is still required to purchase system software that includes a format creation capability. Further, the data entry procedures for known barcode identification systems are typically very difficult to implement. Information to be printed on a record member by a barcode identification system is usually divided into a number of fields such as a barcode field, text field, etc. wherein the layout of the fields is determined by the format selected by the user. Once a format is selected, the user enters data for each of the fields. Often the fields have input restrictions that limit the type of valid characters that may be input. Because of the various input restrictions for data entry and the lack of prompts to aid a user to enter field data, known barcode identification systems can typically be operated only by very experienced users.

SUMMARY OF THE INVENTION

In accordance with the present invention, the disadvantages of prior barcode identification systems have been overcome. The barcode identification system of the present invention is modular in nature so that if a user needs only particular software modules to suit his needs for creating record members such as tags, labels or the like, the user need only purchase those particular modules. Further, each of the modules as well as the system is key protected so that only authorized software modules may be used in the system. A data entry module is provided to aid the user in entering valid data to be printed in accordance with a selected format so that a user does not have to be extremely experienced in order to create a job to be printed by the system.

More particularly, the barcode identification system of the present invention includes a personal computer that operates in accordance with a plurality of software modules for creating barcode identification information to be transmitted to one or more barcode printers. Upon the initialization of each of the software modules, the system determines whether the software module includes a key identification that matches a system key identification. If the software module does not include a matching key identification, the operation of the software module is limited to a demonstration mode. In the demonstration mode, the total time that the software module can operate is limited as well as the time between successive initializations of the software module. The system key employed may be of a type that is removable. However, in order to prevent the system key from being removed during the operation of the system, means are provided for periodically checking to determine whether the system key is present. Operation of all of the software modules is terminated if it is determined that the system key has been removed.

One of the software modules of the present invention is a data entry module that controls a display to display data entry prompts to the user in the form of templates. Each template has a fixed number of single character input positions wherein each of the input positions has an associated individual restriction as to the type of character that is valid for that position. Each input position character restriction is encoded so as to be represented by a single character. Prior to data entry, the displayed template depicts, in each input position, the character representing the restriction associated with that input position. As the user inputs each character into the template, the character representing the input position's restriction is replaced by the data character entered for that input position so as to aid the user in entering valid data for printing on a record member.

The templates employed by the barcode identification system of the present invention, although having a fixed number of single character input positions, can accommodate single characters that require the input of a plurality of characters to define that single character. The system is responsive to a predetermined symbol entered into a single input position of the template to automatically adjust the length of the displayed template to prompt the user to enter the plurality of characters necessary to define the single character.

These and other objects, advantages and novel features of the present invention, as well as details of an illustrated embodiment thereof will be more fully understood from the following description and from the drawing.

BRIEF DESCRIPTION OF THE DRAWING

FIG. 9 is flow chart illustrating a routine to determine whether an application may run in a demonstration mode;

DESCRIPTION OF THE PREFERRED EMBODIMENT

Figure 1:
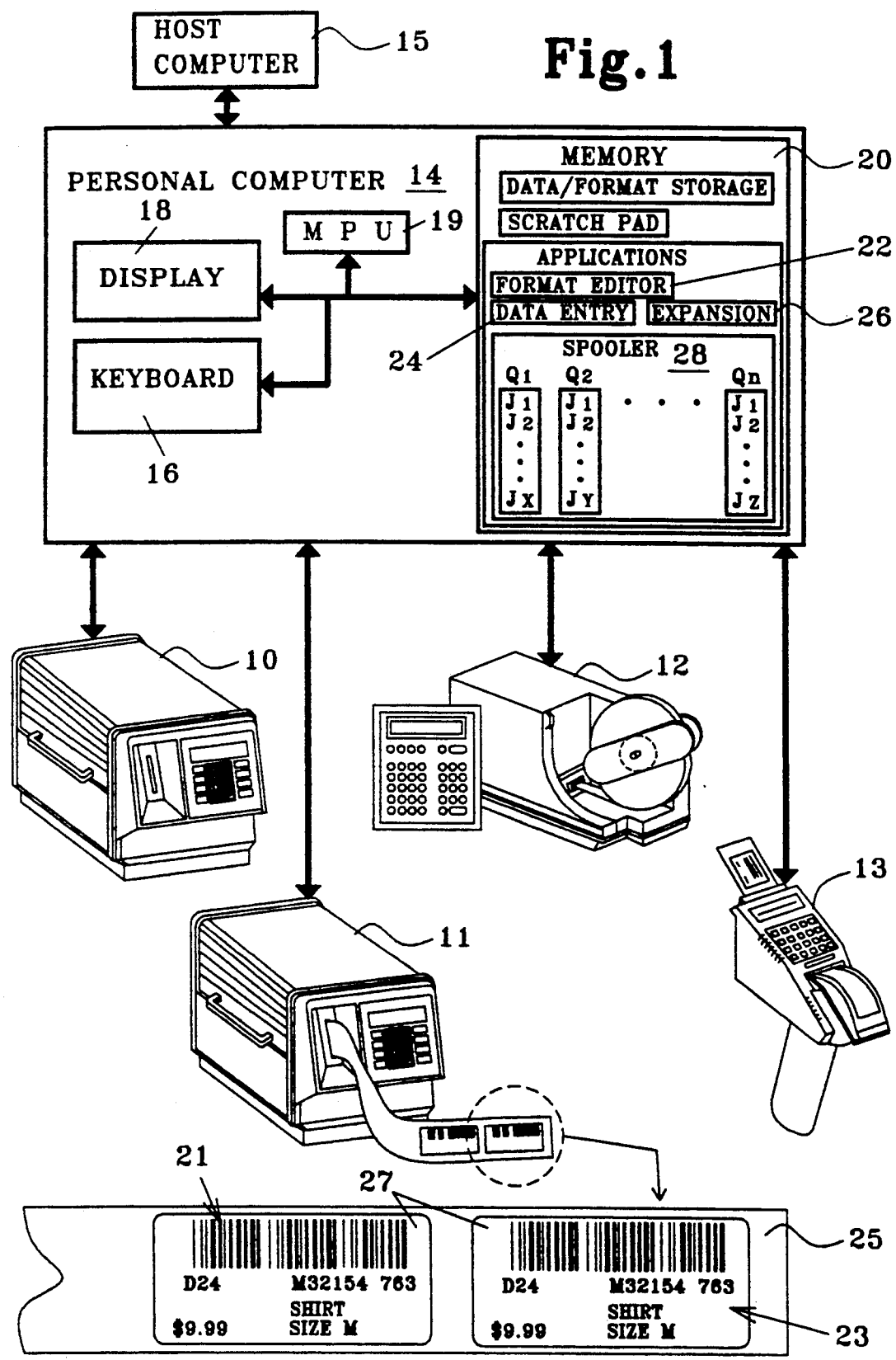
FIG. 1 is a block diagram of the barcode identification system of the present invention illustrating a number of printers in perspective view.

The barcode information system of the present invention as shown in FIG. 1 allows a user to print, via a number of barcode printers 10, 11, 12 and 13, jobs entered into the system via a personal computer 14 hereinafter referred to as the P.C. 14. Each of the printers 10-13 is connected to the P.C. 14 through a RS 232 interface or the like. The system of the present invention also allows a host computer 15 to interface with the barcode printers 10-13 via the P.C. 14 so that print jobs or portions thereof can originate with the host computer. The P.C. 14 includes a keyboard 16 for entering information into the system in order to create a job to be printed. The P.C. 14 also includes a display 18 to prompt the user to enter particular information and to provide feedback to the user regarding the operation of the system. The P.C. 14 includes a microprocessor 19 that operates in accordance with application software stored in a memory 20 to create the information necessary to print a job on one or more of the printers 10-13.

The barcode printers of the system may be compatible such as printers 10 and 11 in that these printers communicate in the same language and/or have the same user selectable format options defining the way in which barcode data 21 and related alphanumeric data 23 may be printed on a web 25 of record members 27 such as tags, labels or the like. Alternatively, the barcode printers of the system may be incompatible such as printers 10, 12 and 13 in that the printers do not speak the same language and/or do not have the same user selectable format options. The barcode identification system allows a user to define multi-printer formats for a job to allow a job to be printed on any one of the incompatible printers for which the job was created.

To create a typical barcode print job, the user first creates a format for the job utilizing a format editor routine 22. The format editor 22 allows a user to create a single format for a number of incompatible printers. Once the user selects the printers for a format to be created or modified, the format editor 22 automatically prompts the user to create a multi-printer format by providing to the user for his selection only those format options that are common to all of the printers selected by the user for a format. Thus the multi-printer format created is compatible with each of the otherwise incompatible printers. A suitable format editor routine is depicted in U.S. patent application Ser. No. 07/783,579 entitled Barcode Identification System Format Editor, filed concurrently herewith, which application is assigned to the assignee of the present invention and incorporated herein by reference.

After a format for one or more print jobs is created, a user may run a data entry routine 24 to interface with the user, prompting the user to select the format to be utilized for a job and to enter data for the job. As discussed in detail below, the data entry routine of the present invention prompts the user to enter valid data so that a user need not be extremely experienced in order to create jobs to be printed by the system. When a job is ready to be printed as indicated by a user via the keyboard 16, an expansion routine 26 combines the data entered during the operation of the data entry routine 24 with the designated format generated by the format editor 22 and sends a print command to a spooler 28 as discussed in detail below.

When the spooler 28 receives the print command for a job, the spooler looks at the destination queue designated in the print command and determines whether there is a printer assigned to the designated queue that is capable of printing the job. The spooler 28 may be configured by a user to assign one printer to one queue; multiple printers to one queue or multiple queues to one printer. Each printer assigned to a given queue may not be capable of printing every job listed in that queue. When the spooler 28 receives a print command for a job, the spooler determines whether there is one printer assigned to the job's destination queue that is of a type listed in the job's print command as being capable of printing the job's format. If so, the spooler adds the job to the designated destination queue in a position associated with the job's designated priority. The spooler 28 monitors the status of each of the printers 10-13 to determine when a given printer is ready to receive a job for printing. When the spooler 28 finds a printer that is ready to print a job, the spooler searches each of the queues for the highest priority job capable of being printed on the same type of printer as the ready printer. Thereafter the spooler transfers the highest priority job that is found to the ready printer for printing. A suitable spooler is disclosed in U.S. patent application Ser. No. 07/783,765 entitled Barcode Identification System Spooler, filed concurrently herewith, which application is assigned to the assignee of the present invention and incorporated herein by reference.

Figure 2:
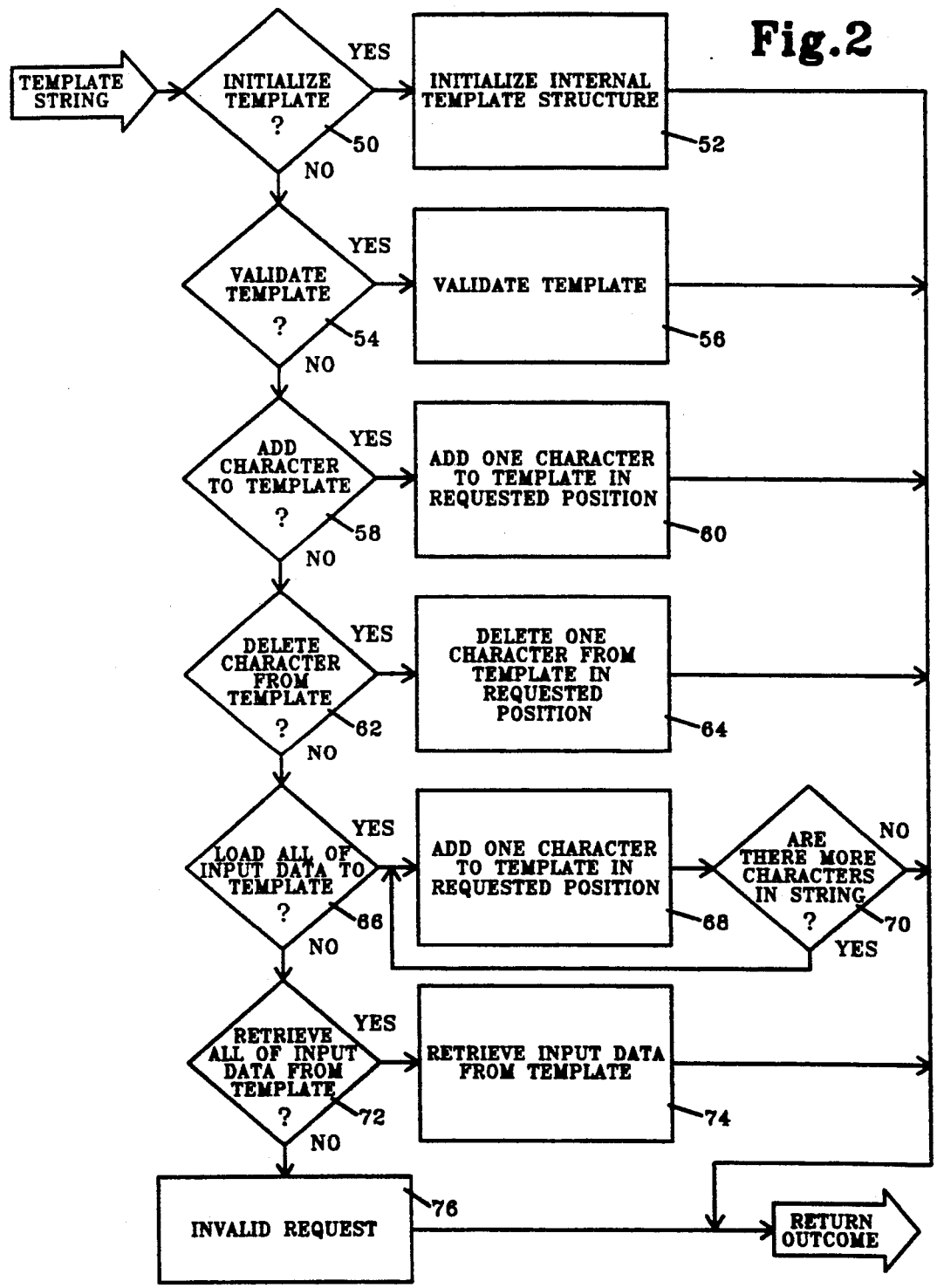
FIG. 2 is a flow chart illustrating the data entry routine of the present invention.

FIG. 2 illustrates a portion of the data entry routine 24 for handling the input of template data. A template is a character string that is used to control how a user may enter data into a field. In order to have a single template that may specify fixed characters as well as define input characters, the template is broken into three possible tokens: the actual input mask and fixed data before and after the input mask. The input mask of each template has a fixed number of character input positions. Each input position may be assigned a different input type restriction as opposed to having one restriction limiting the input type of the entire template. Each type of input restriction is encoded so as to be represented by a single character. For example, the character "A" may be used to represent that a given input position is restricted to an alpha character; the character "#" may be used to restrict an input position to a numeric character; etc.

When the template is first displayed via the display 18 to a user prior to data entry into the template, the character representing the restriction for a given input position is displayed in that input position. A cursor is positioned to point to the first input position. When a user enters a valid character for the first input position, the entered character replaces the character representing the restriction for the input position on the displayed template and the cursor is moved to point to the second input position of the template and so on. The template thus aids the user in entering valid data for each field of the job being created. It is noted that the input mark for the template may also include fixed characters in a number of the input positions.

Although each template has a fixed length, i.e., a fixed number of character input positions, the template processing of the present invention can accommodate a single character capable of being printed by one of the barcode printers but that requires the input of a plurality of characters to define that one character so that it is recognizable by a printer 10, 11, 12, 13. More particularly, a particular symbol such as the tilde symbol, i.e. "~", may signal to a particular barcode printer that a function code for the printer is to follow, wherein the function code requires three input positions. The barcode printer however may be capable of printing the "~" symbol itself. In order to distinguish whether it is the tilde symbol that is to be printed or a tilde function code, the microprocessor is responsive to a tilde entered into a given input position of a template, where such a symbol is allowed, by automatically inserting three extra input subpositions or place holders following the tilde in the template displayed to the user on the display 18. If the next character entered following the first tilde is a second tilde, the last two added input positions are eliminated since a sequence "~ ~" represents that the tilde symbol itself is to be printed on a record member. If however the first tilde is followed by a numeric, the two remaining place holders are maintained on the display to prompt the user to enter the remaining two digits of a three-digit function code. Therefore, the template of the present invention is extremely flexible in accommodating characters that cannot be recognized by a printer from the input of a single character.

Figure 3:
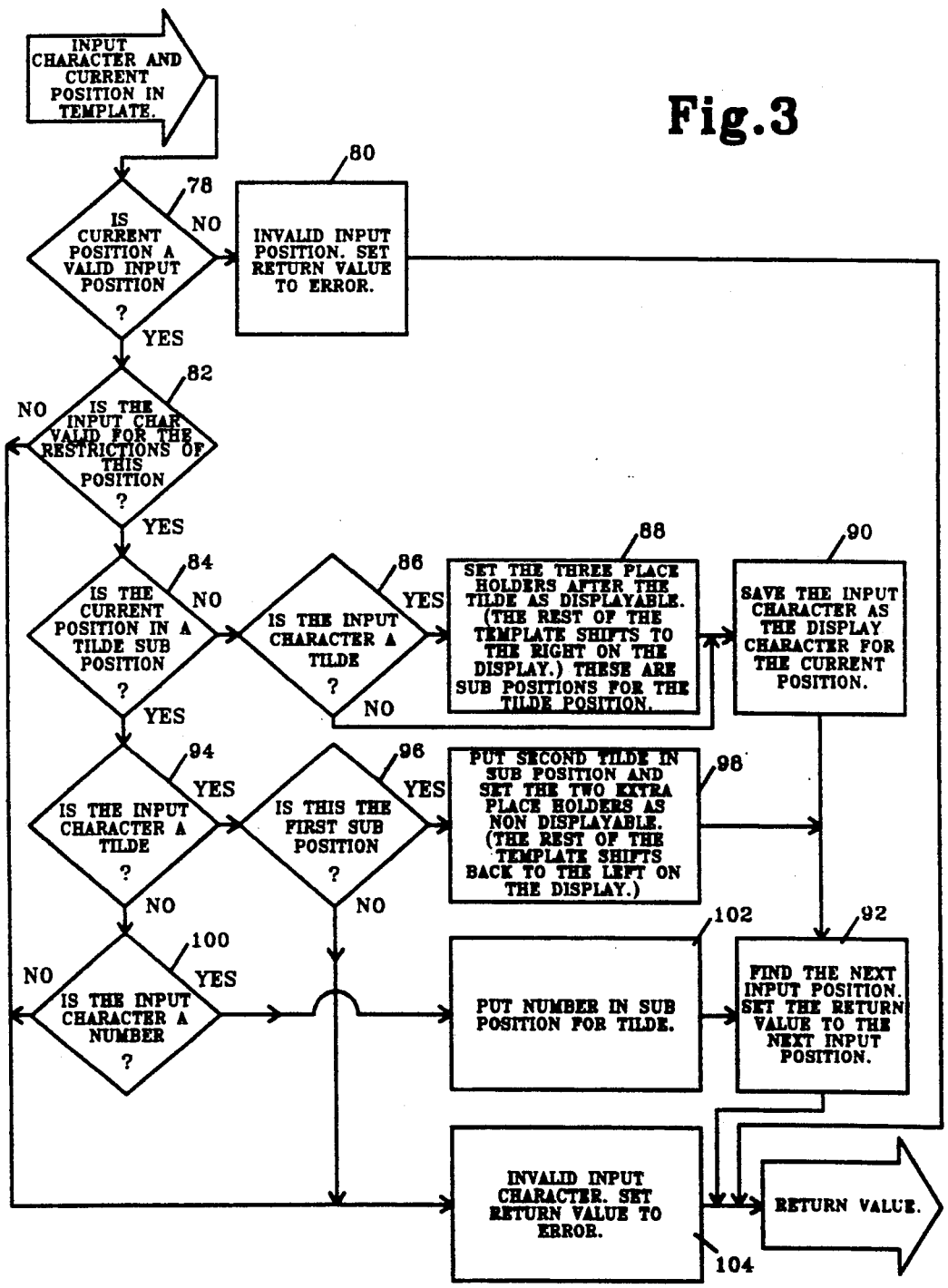
FIG. 3 is a flow chart illustrating a routine for adding a character to a template as called by the routine depicted in FIG. 2.

More particularly, in processing templates, as shown in FIG. 2, the microprocessor 19 at a block 50 first determines whether the user wants to initialize a template and if so proceeds to block 52 to initialize the internal structure thereof. At block 54 the microprocessor 19 determines whether the user wants to validate a template and if so at block 56 the microprocessor validates the template. At block 58 the microprocessor 19 determines whether the user is adding a character to the template and if so, the microprocessor calls the routine depicted in FIG. 3 to process the adding of a character to the template As shown in FIG. 3, the microprocessor 19 first determines at block 78 whether the current position of a displayed cursor is a valid input position. If not, the microprocessor at block 80 indicates that the input position is invalid, setting a return value to indicate an error. If, however, the microprocessor 19 determines at block 78 that the current position of the cursor is pointing to a valid input position, the microprocessor proceeds to block 82. At block 82 the microprocessor 19 determines whether the character entered by the user for a given input position is valid for the restriction associated with that input position. If the input character is not of the type required by the input position's restriction, the microprocessor 19 proceeds to block 104 to indicate an invalid input character, setting a return value to indicate an error. If the input character is valid for the input position, the microprocessor 19 proceeds from block 82 to block 84 to determine whether the current position is in a tilde subposition. If not, the microprocessor at block 86 determines whether the input character is a tilde. If the input character is not a tilde, the microprocessor 19 proceeds from block 86 to block 90 to save the character entered by the user as the input character for the input position. At block 90 the microprocessor 19 also controls the display 18 to display the input character in the input position so that it replaces the character representing the restriction associated with the input position. From block 90 the microprocessor proceeds to block 92 to find the next input position and to increment the displayed cursor to the next input position. If the microprocessor 19 determines at block 86 that the input character is a tilde, the microprocessor proceeds to block 88. At block 88 the microprocessor sets three placeholders after the tilde in the displayed template so that the rest of the template shifts to the right on the display 18. These three placeholder positions are subpositions for the tilde sequence. When the user enters input data to the template, if the microprocessor 19 determines at block 84 that the current position in the template is a tilde subposition, the microprocessor proceeds to block 94 to determine whether the character input by the user in the first tilde subposition is another tilde. If so, the microprocessor proceeds to block 96 to determine whether the input position is the first subposition in the tilde sequence. If not, the microprocessor 19 proceeds to block 104 indicating an invalid input character since a tilde can only be in the first subposition of a tilde sequence. If the microprocessor 19 confirms that the second tilde entered is in the first subposition of the tilde sequence, the microprocessor proceeds to block 98. At block 98, the microprocessor displays a second tilde in the first subposition and sets the two extra placeholders previously set at block 88 to non-displayable so that the remainder of the template shifts back to the left on the display. From block 98 the microprocessor proceeds to block 92 to increment the cursor to the next input position of the template. If the microprocessor at block 94 determines that the input character in a tilde subposition sequence is not a second tilde, the microprocessor 19 proceeds to block 100. At block 100 the microprocessor determines whether the input character is a number. If not, the microprocessor proceeds to block 104 to indicate an invalid input character. If, the input character in the tilde subposition is a number, at block 102 the microprocessor 19 displays the number in the tilde subposition of the template. The microprocessor then proceeds to block 92. The microprocessor 19 in accordance with the routine depicted in FIG. 3 thus automatically accommodates the inputting of special characters into a fixed length template where the special character requires a variable number of input positions to define the character so that it is recognizable by a barcode printer 10, 11, 12, 13.

Figure 4:
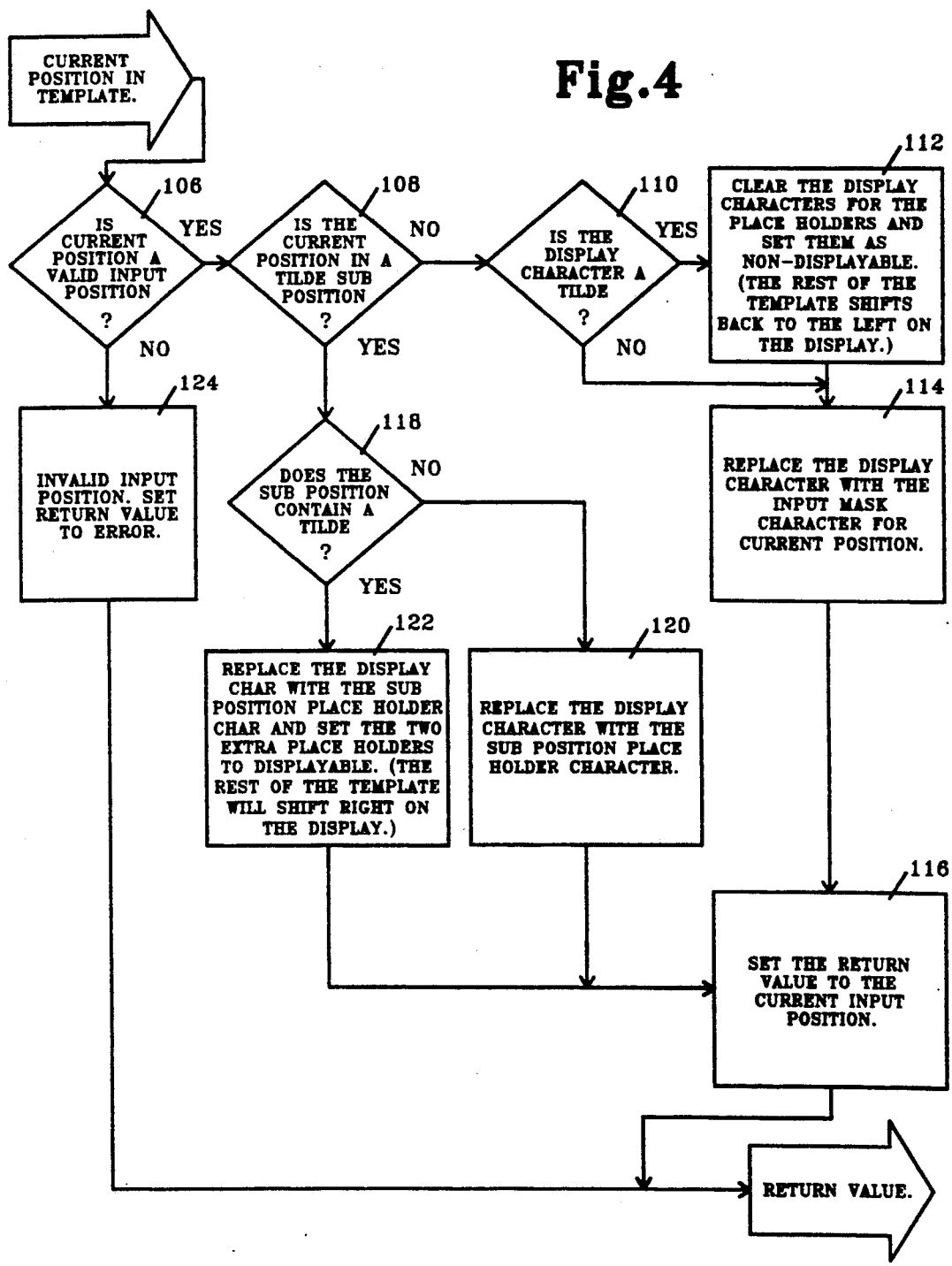
FIG. 4 is a flow chart illustrating a routine for deleting a character from a template as called by the routine depicted in FIG. 2.

Returning to FIG. 2, if the microprocessor 19 determines at block 62 that the user wants to delete a character from a displayed template, the microprocessor 19 proceeds to block 64 to call the routine depicted in FIG. 4 for processing the deletion of a character from a template. As shown in FIG. 4, the microprocessor 19 at block 106 first determines whether the current position is a valid input position. If not, the microprocessor at block 124 indicates that the input position is invalid, setting a return value to indicate an error If the current position is a valid input position, the microprocessor proceeds to block 108. At block 108 the microprocessor 19 determines whether the current position is a tilde sequence subposition and if not, the microprocessor 19 proceeds to block 110. At block 110 the microprocessor determines whether the displayed character is a tilde and if not, the microprocessor at block 114 replaces the character previously input by the user to the template with the input mask character representing the input restriction associated with that current input position. From block 114 the microprocessor proceeds to block 116 to set the return value to the current input position. If the microprocessor 19 determines at block 110 that the current input position is displaying a tilde, the microprocessor proceeds from block 110 to block 112. At block 112 the microprocessor clears the displayed characters in the tilde sequence, the placeholders in the sequence becoming non-displayable. The rest of the template then shifts back to the left on the display 18. If the microprocessor at block 108 determines that the current position is a tilde sequence subposition, the microprocessor proceeds from block 108 to block 118. At block 118 the microprocessor 19 determines whether the tilde subposition contains a tilde. If the subposition does not contain a tilde, the microprocessor proceeds to block 120 to replace the character previously input by the user in the subposition with a placeholder for the subposition, effectively erasing the character from the tilde subposition. Thereafter, the microprocessor proceeds to block 116. If, however, the microprocessor 19 determines that the subposition does contain a tilde, the microprocessor proceeds to block 122 to replace the tilde displayed in the subposition with a subposition placeholder character and further displays two extra placeholders. The remainder of the template then shifts to the right on the display 18.

Returning to FIG. 2, the microprocessor 19 determines at block 66 whether an input data string is to be added into a template and if so, at block 68 the microprocessor 19 calls the routine depicted in Fig. 3 for adding one character to the template as discussed above. After adding one character, the microprocessor 19 then proceeds to block 70 to determine whether there are more characters in the data string to be added to the template and if so, the microprocessor 19 loops back to block 68 from block 70 to add the next character. The microprocessor continues adding characters from the input data string to the template until there are no more characters in the string as determined at block 70. If the microprocessor determines at block 72 that the user wants to retrieve all of the input data from a template, the microprocessor proceeds to block 74 to retrieve the input data therefrom.

The data entry routine 24 also allows a user to search a database in the memory 20 that stores data for various fields to be printed. Data for each field stored in the data base includes a search key associated therewith to allow the microprocessor 19 to look up the data for a field in response to a search key input by a user via the keyboard 16. The microprocessor 19 controls the display 18 to depict not only the entered search key or search keys, but also controls the display 18 to display the database result field, i.e. the record formed by the data fields that are retrieved in the search.

Figure 5:
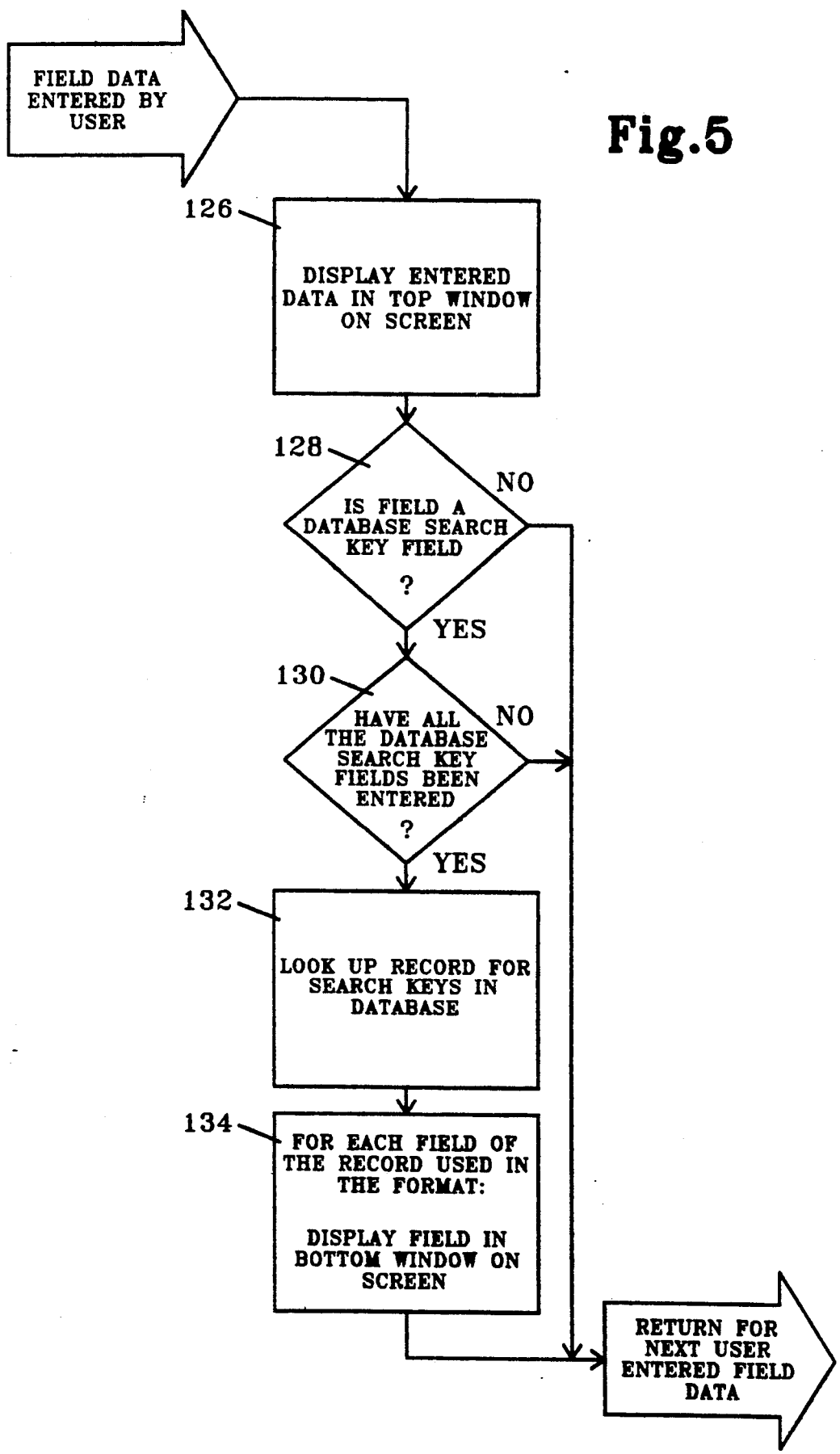
FIG. 5 is a flow chart illustrating a data base result fields look up and display routine.

More particularly, as shown in FIG. 5, when the microprocessor 19 determines that field data is entered by a user, the microprocessor at block 126 displays the entered field data in a top window on the screen of the display 18. Thereafter, the microprocessor at block 128 determines whether the entered field data is a database search key field and if not, the microprocessor exits the routine. If, however, the microprocessor 19 determines that the entered field data does represent a database search key, the microprocessor 19 proceeds to block 130 to determine whether all of the database search key fields have been entered for a given record. If not, the microprocessor 19 exits the routine to prompt the user to enter the remaining database search key fields. If all of the database search keys have been entered for a given record, the microprocessor proceeds to block 132 to look up the record for the search keys from the database of the memory 20. The microprocessor at block 134 then controls the display 18 to display the data for each field of the record associated with the input search keys. Because database result fields are displayed, the user is able to determine whether the data that was expected to be retrieved from a search is correct before the data is printed in a selected format.

Figure 6:
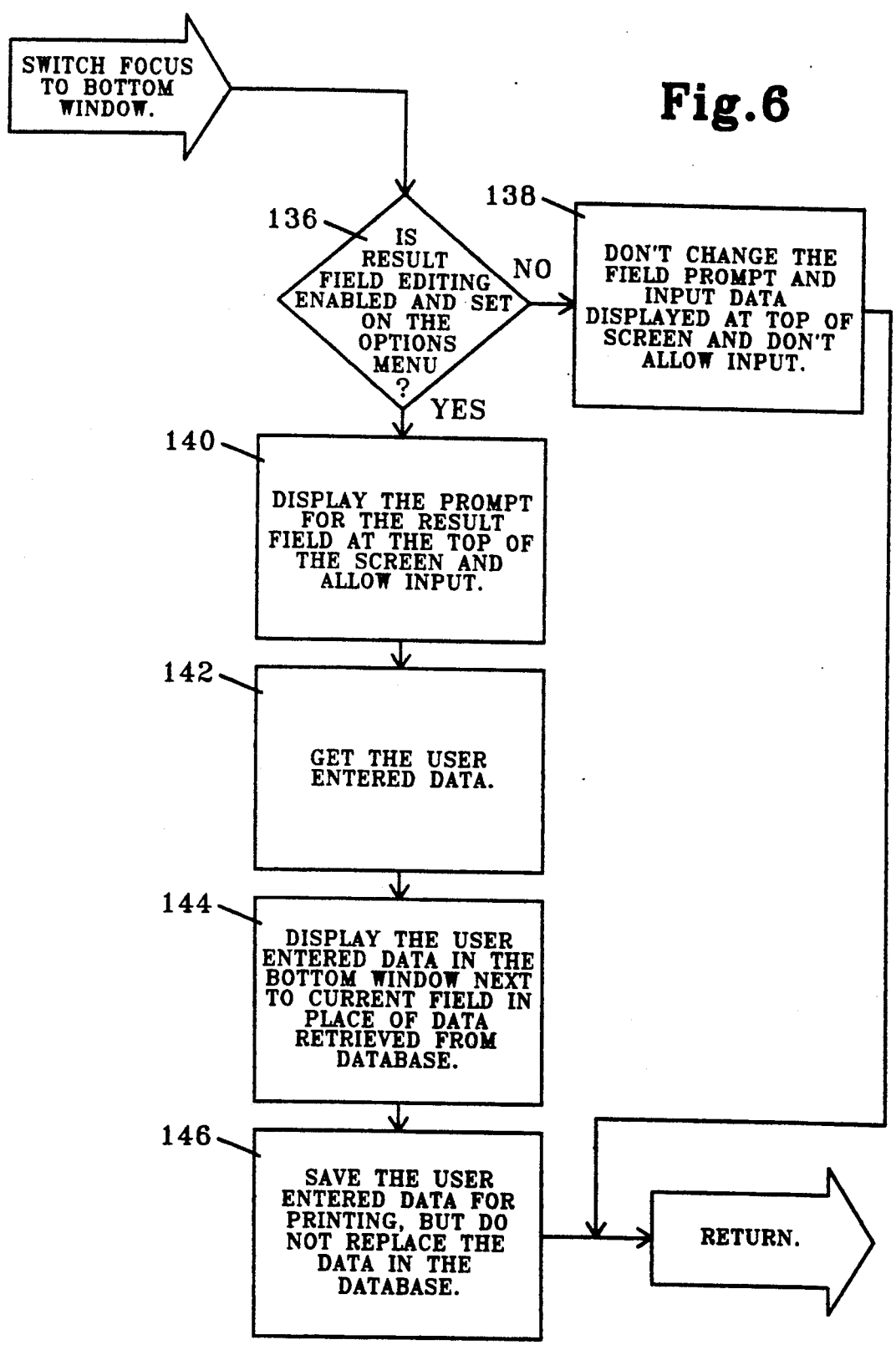
FIG. 6 is a flow chart illustrating a data base result fields user editing routine.

The database result fields depicted on the display 18 can be edited by the user without affecting the actual database records. This option can be password protected. For example, as depicted in FIG. 6, if the microprocessor determines at block 136 that a result field editing option has been enabled and has been selected by a user from an options menu, the microprocessor proceeds to block 140 to display a prompt in a window at the top of the display screen 18 for the result field depicted in a window at the bottom of the screen 18. If, however, the microprocessor determines at block 136 that the result field editing option has not been enabled or set on the options menu, the microprocessor proceeds to block 138. At block 138, the microprocessor 19 does not change the field prompt or result field depicted on the display 18 and further does not allow a user input to modify the result field. From block 140 the microprocessor proceeds to block 142 to get the new data entered by a user. At block 144 the microprocessor 19 then displays in a window the user entered data adjacent to the current field in place of the data previously retrieved from the database. At block 146 the microprocessor saves the user entered data for printing; but does not replace the field data stored in the database of the memory 20. This feature allows a user who is authorized and has the proper password to modify data represented in a database result field so that the modified field may be printed without modifying the field data stored in the database. This feature may be used, for example, where a user wants to modify the selling price of an item for a sale without affecting the price of the item stored in the database. When the sale is over, tags or labels can be printed with the nonsale price of the item depicted thereon without having to modify any stored field data.

Figure 7:
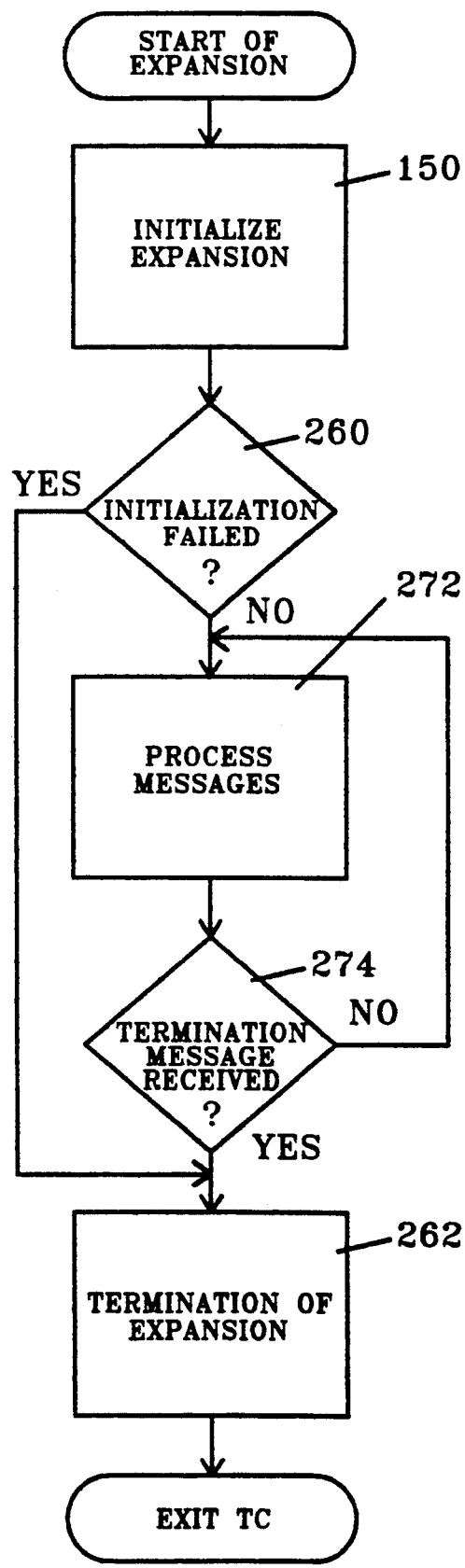
FIG. 7 is a flow chart illustrating an Expansion routine.

After a user creates a job by selecting a format and entering or retrieving the data for each field of the format, an Expansion routine depicted in FIG. 7 is called to combine the selected format and data in order to create the job so that it may be sent to the spooler for distribution to a printer for printing. The expansion routine further performs various processes and validation procedures as discussed in detail below. When the expansion routine is first loaded from disk into the memory 20, the microprocessor 19 initializes the expansion routine at a block 50. More particularly, at block 150 the microprocessor 19 initializes various parameters and calls a key validation routine as depicted in FIG. 8.

The software of the system of the present invention is modular in nature in that not every one of the software modules such as the format editor 22 or data entry routine 24 is required for the system to operate. Only the spooler module 28 is actually required since the spooler controls the transmission of print jobs to the printers 10-13. In order to protect the system and prevent unauthorized use thereof a system key is employed. A suitable key is manufactured by Software Security Inc. and is called the Activator. The Activator is a keyed block that is connected to the parallel communication port of the P.C. 14 wherein the Activator block provides a system key identification that may be read by the P.C. 14 without interfering with the communications of the P.C. via the port to which the block is connected.

Figure 11:
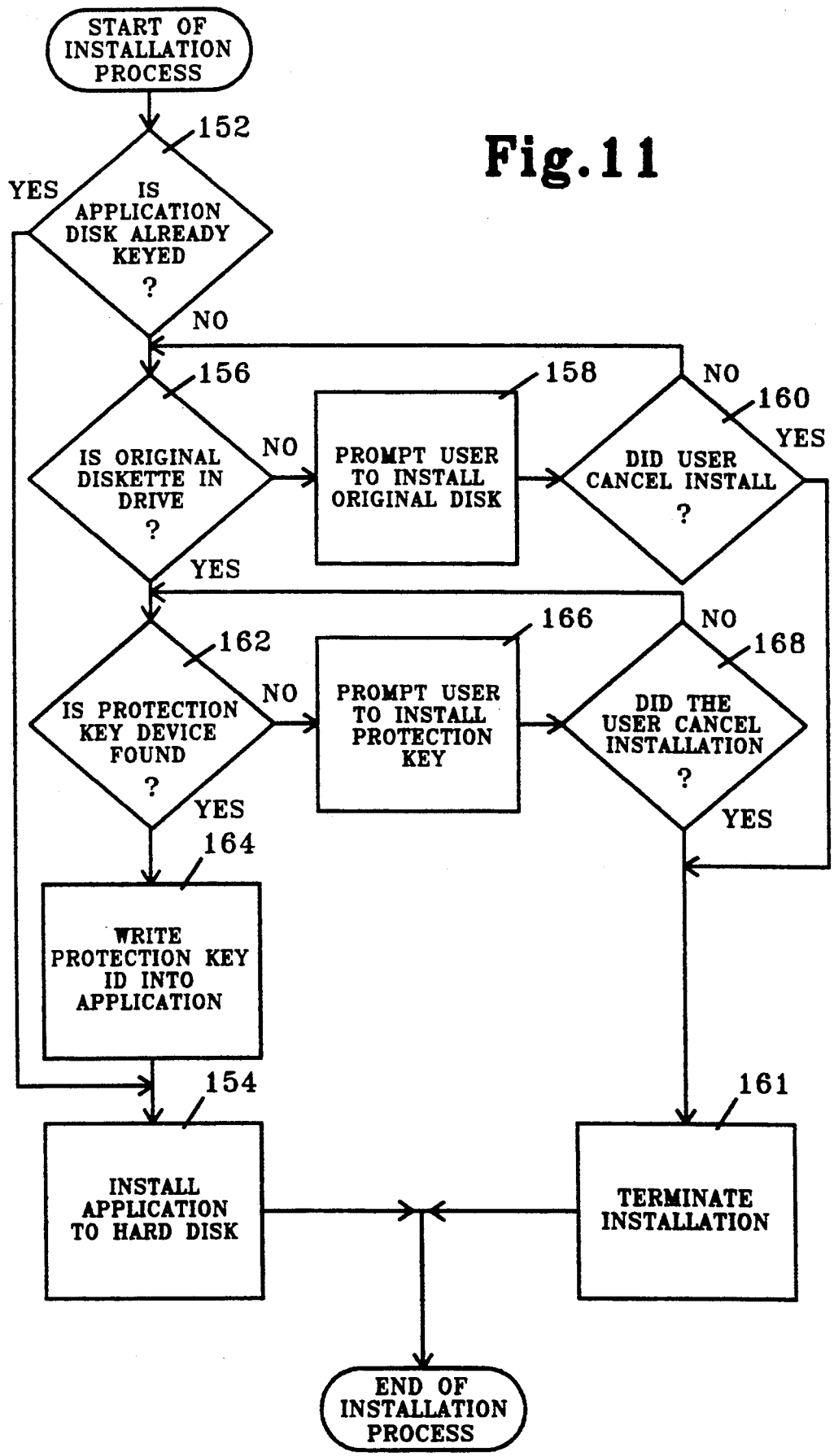
FIG. 11 is a flow chart illustrating a key installation routine.

Each of the software modules that are authorized for operation in the system are programmed by a key installation routine depicted in FIG. 11. Each software module must include a key identification that matches the system key identification provided by the Activator block or the microprocessor 19 prevents the application from operating normally. More particularly, if the microprocessor 19 does not find a matching key in the software module, the microprocessor 19 limits the operation of the software module to a demonstration mode if the demonstration mode is allowable as discussed in detail below. As shown in FIG. 11, during the key installation process, the microprocessor 19 at a block 152 first determines whether the software module or application has already been keyed or not and if so, the application is installed to a disk at block 154. If however, the microprocessor 19 determines at block 152 that the application has not already been keyed, the microprocessor proceeds to block 156. At block 156 the microprocessor determines whether the original diskette is installed in the drive for the P.C. 14 and if not, the microprocessor 19 at block 158 prompts the user to install the original diskette. Thereafter, at block 160 the microprocessor determines whether the user has canceled the installation process and if not, the microprocessor proceeds back to block 156 to determine whether the original diskette has now been installed in the drive of the P.C. 14. If the microprocessor determines at block 160 that the user has canceled the installation process, the microprocessor 19 proceeds to block 161 to terminate the application. If, the microprocessor 19 determines at block 156 that the original diskette is in the disk drive of the P.C. 14 the microprocessor proceeds to block 162 to determine whether the system key is found, i.e., whether the Activator block is connected to the parallel communication port of the P.C. 14. If not, the microprocessor at block 166 prompts the user to install the system key and at block 168 determines whether the user has canceled the installation process or not. If the microprocessor determines at block 162 that the system key is found, the microprocessor proceeds to block 164 to write the system key identification into the application. Thereafter, the microprocessor proceeds to block 154 to install the keyed application to the disk.

Figure 8A:
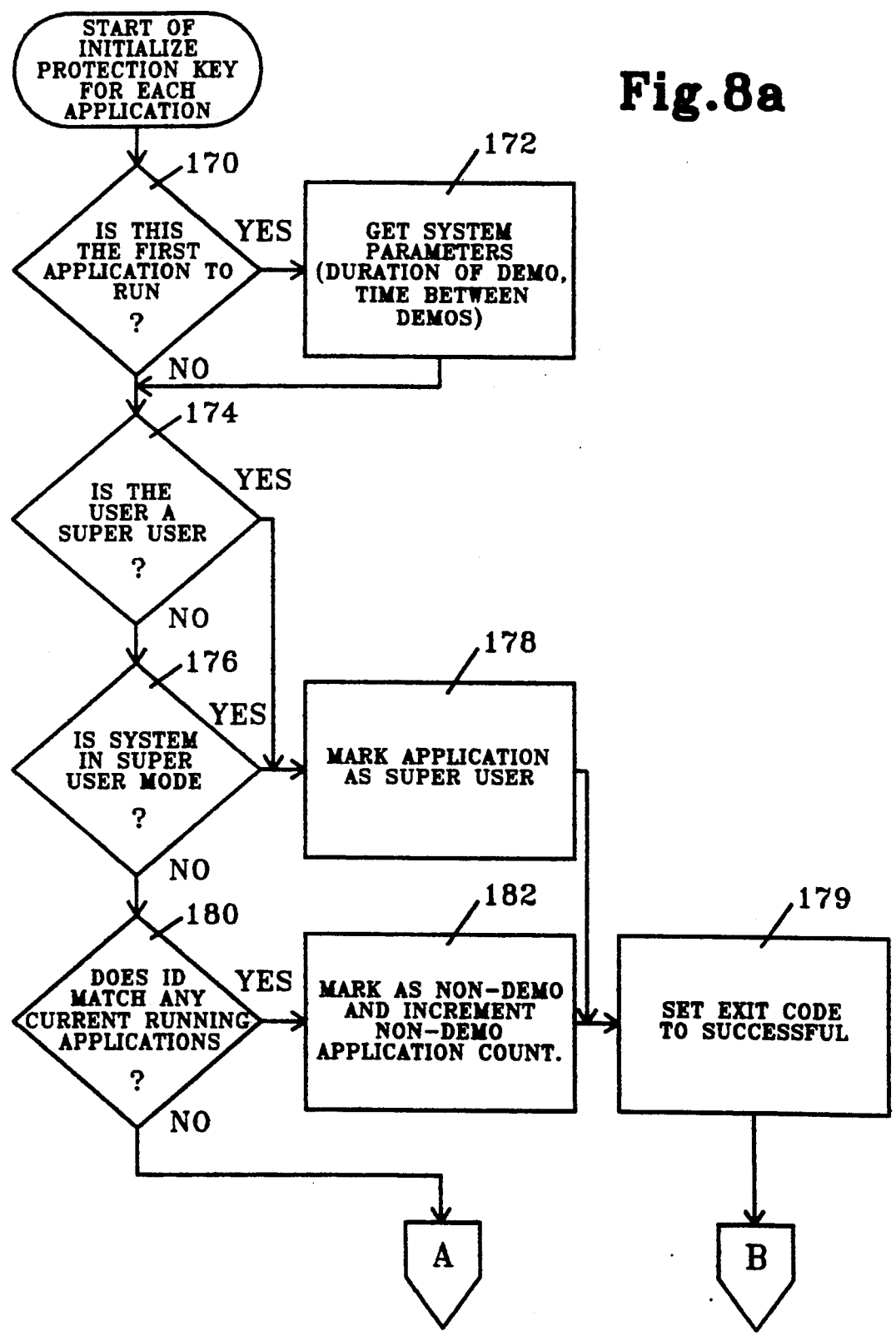
FIGS. 8A, B and C form a flow chart key identification validation routine called by each of the software modules of the present invention.
Figure 8B:
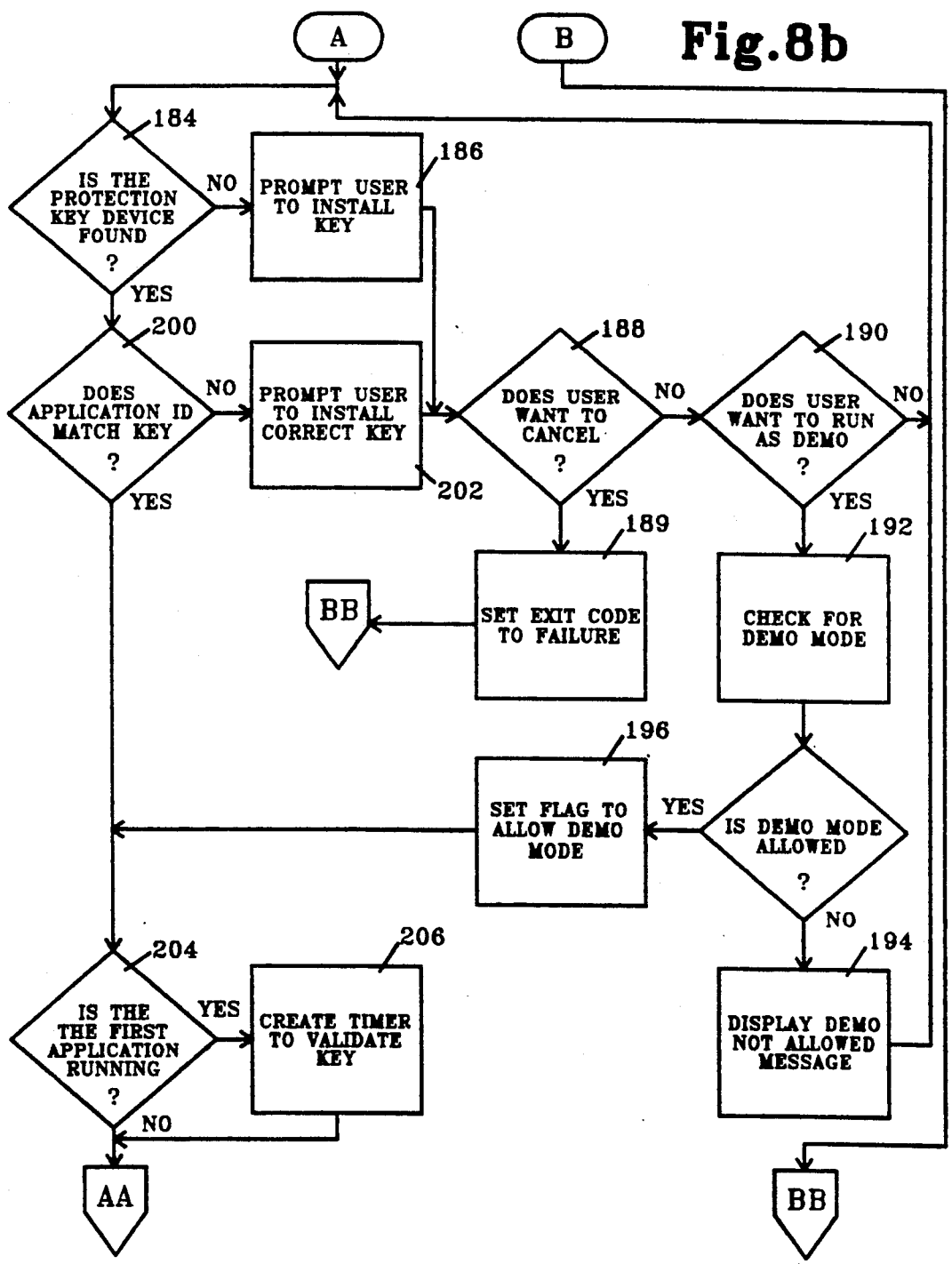

Upon the initialization of each of the software modules 222, 24, 26 and 28, each of the modules calls the key validation routine depicted in FIG. 8. Upon entering the key validation routine, the microprocessor 19 at block 170 determines whether this is the first application, i.e., software module to be validated and if so, the microprocessor proceeds to block 172. At block 172, the microprocessor 19 gets the system parameters including the maximum duration of time that the system allows applications to run in a demonstration mode between successive initializations and the minimum time allowable between successive initializations of an application in a demonstration mode. At a block 174 the microprocessor 19 determines whether an application is a super user. The microprocessor determines that an application is a super user if the application is keyed as such. Super users are applications that can get around the key protection of the system. The system can also have a flag that is set to indicate that the system itself is a super user, i.e., a flag indicating that the system is operating in a super user mode. If the microprocessor determines at block 174 that the application is a super user, the microprocessor at block 178 marks the application as such and at block 179 the microprocessor 19 exits the key validation routine with success. If the microprocessor determines at block 174 that the application is not a super user the microprocessor determines at block 176 whether the system is operating in the super user mode. If so, the microprocessor proceeds to block 178 to mark the application as a super user and at block 179 the processor exits the routine with success. If the application is not super user or the system is not operating in the super user mode, the microprocessor proceeds to block 180.

At block 180 the microprocessor 19 determines whether the application includes a key identification that matches the key identification of any currently running application. If so, the microprocessor proceeds to block 182 to mark the application as a non-demo application and further increments the count of a counter representing the number of non-demo applications of the system. If the microprocessor 19 determines at block 180 that the application does not include a key identification that matches any currently running application, the microprocessor proceeds to block 184. At block 184 the microprocessor determines whether the system key device, i.e., the Activator block, has been found or not. If the microprocessor 19 has not found the system key device, the microprocessor proceeds to block 186 to prompt the user via the display 18 to install the system key. Thereafter at block 188 the microprocessor determines whether the user wants to cancel and if so, the microprocessor at block 189 exits the key validation routine with a failure status. If the user does not want to cancel, the microprocessor proceeds from block 188 to block 190 to determine whether the user wants to run the application in a demonstration mode. If not, the microprocessor loops back to block 184 to determine whether the user has now installed the system key device. If the microprocessor determines at block 190 that the user does want to run the application in the demonstration mode, the microprocessor proceeds to block 192. At block 192 the microprocessor determines whether the demonstration of the application is allowable in accordance with the routine depicted in FIG. 9 discussed in detail below. If the microprocessor 19 determines that a demonstration is not allowed, the microprocessor at block 194 controls the display 18 to display a message that the demonstration of the application is not allowed. The microprocessor then proceeds from block 194 to block 184. If the microprocessor at block 192 determines that a demonstration of the application is allowed, the microprocessor at a block 196 sets a flag to indicate that the application will start in the demonstration mode and the microprocessor proceeds to block 204.

If the microprocessor determines at block 184 that the system key device is found, the microprocessor at block 200 determines whether the application includes a key identification that matches the system key identification found. If so, the microprocessor proceeds to block 204 to determine whether this is the first starting application of the system. If it is, the microprocessor 19 proceeds to block 206 to create a timer to validate the system key. More particularly, this is a timer that times out for example every 15 seconds causing the microprocessor to implement the timer event routine depicted in FIG. 10 discussed in detail below. At a block 208 the microprocessor then determines whether this application is starting in the demonstration mode and if not, the microprocessor proceeds to block 212. At block 212 the microprocessor 19 marks the application as a non-demo application and increments the count of non-demo applications for the system. If the microprocessor determines at block 208 that this application is going to start in the demonstration mode, the microprocessor proceeds to block 210 to mark the application as a demo application and increments a counter the count of which represents the number of demonstration applications that have run on the system. From block 210 or 212 the microprocessor 19 proceeds to block 214 to exit the key validation routine with success.

The microprocessor 19 determines whether an application can run in the demonstration mode in accordance with the flow chart depicted in FIG. 9. The microprocessor 19 at block 216 first retrieves the current date and time from the memory 20. Thereafter, at a block 218 the microprocessor retrieves the date and time at which the last demonstrated application was started or initialized. At block 220 the microprocessor 19 determines whether the time that the last application was first started, as determined at block 218, plus the minimum allowed time between demonstration starts is earlier than the current time. If it is, the microprocessor proceeds to block 222 to reset the timer monitoring the running time of demonstration applications and at block 224 to reset the date and time that the "last" application is being started in the demonstration mode to the current time so as to allow an application to be run in the demonstration mode. If however, the time that the last application was started in the demonstration mode plus the minimum allowed time between demonstration starts is after the current time, the microprocessor 19 proceeds to block 226. At block 226 the microprocessor determines whether there is any time left for an application to run in the demonstration mode, and if so, the microprocessor 19 proceeds from block 228 to block 232 to exit the routine with a start demonstration mode indication. If the maximum operating time for the demonstration mode has expired, the microprocessor exits the routine at block 230 with an indication that the application is not to start in the demonstration mode. From the above it is thus seen that there are two time limits on applications running in the demonstration mode. The first time limit represents the maximum time that an application is allowed to run in the demonstration mode which may be, for example, one hour. The second time limit represents the minimum time that must pass between successive starts or initializations of an application in the demonstration mode.

Figure 10:
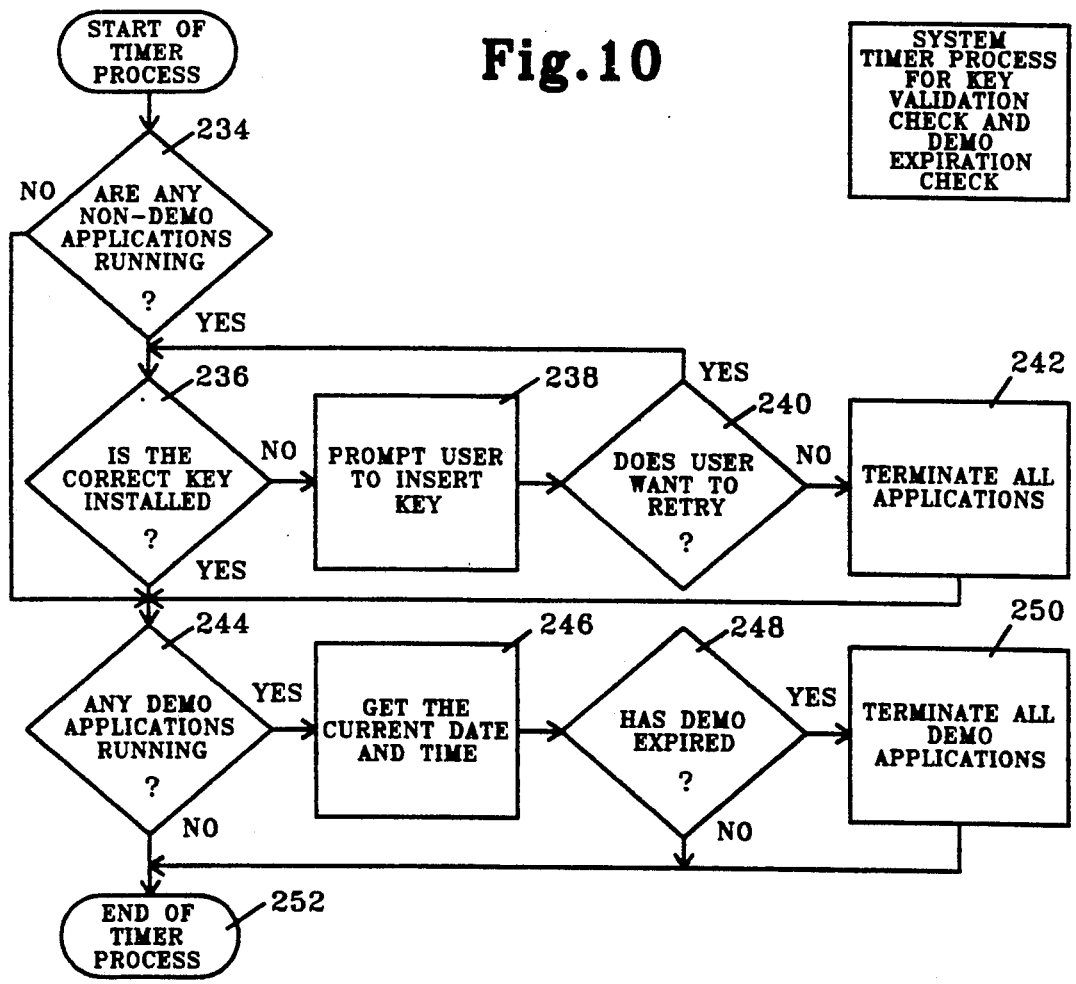
FIG. 10 is a flow chart illustrating a key timer software routine.

Each time the validate key timer, initialized at block 206, expires, the microprocessor calls the routine depicted in FIG. 10. Upon entering this routine, the microprocessor at block 234 determines whether there is a non-demo application and if so, the microprocessor proceeds to block 236. At block 236 the microprocessor determines whether the correct system key device is still connected to the parallel communication port of the P.C. and if so, the microprocessor proceeds to block 244. If the correct system key is not connected to the P.C. 14, the microprocessor 19 at block 238 prompts the user via the display 18 to insert the system key. Thereafter, the microprocessor 19 at block 240 determines whether the user wants to retry the system key validation and if so, the microprocessor loops back to block 236. If the microprocessor does not want to retry, the microprocessor proceeds to block 242 to terminate all of the applications or software modules. From blocks 234, 236 or 242 the microprocessor proceeds to block 244 to determine whether there are any applications running in the demonstration mode and if not, the microprocessor exits the routine at block 252. If there are applications running in the demonstration mode, the microprocessor at block 246 retrieves the current time and date and at block 248 determines whether the maximum demonstration running time has expired or not. If the maximum demonstration running time has expired the microprocessor proceeds to block 250 to terminate all of the applications that are running in the demonstration mode of operation, the microprocessor exiting the routine at block 252.

Figure 13:
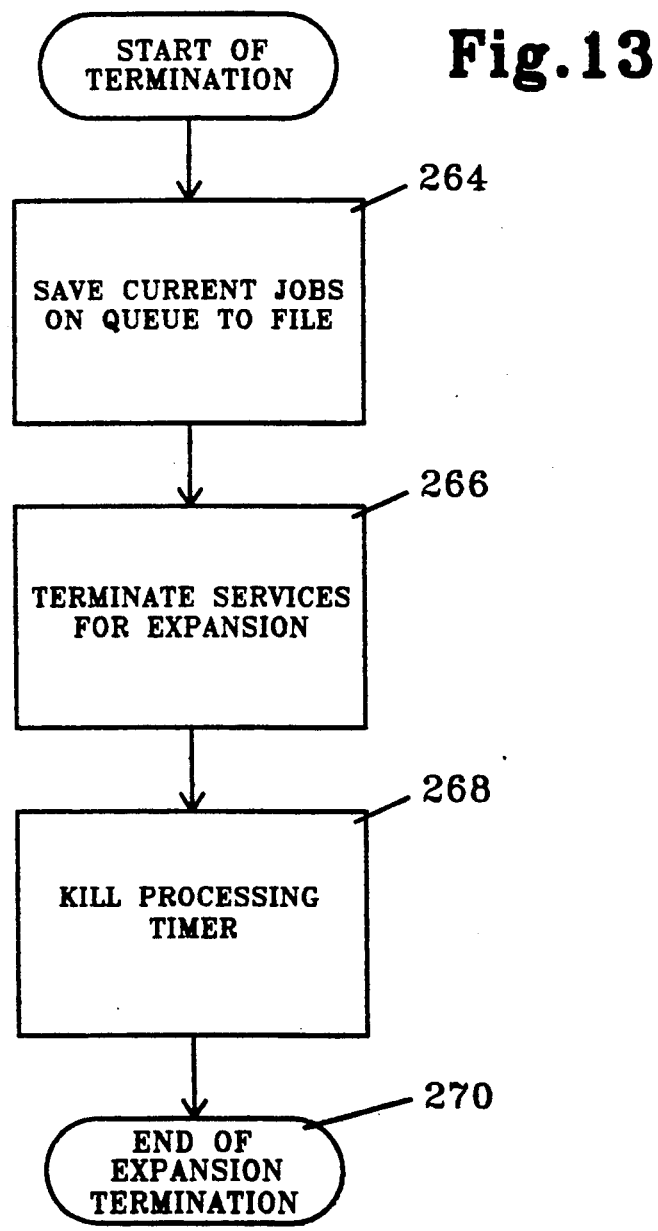
FIG. 13 is a flow chart illustrating an expansion termination routine.

With reference to FIG. 7, after the Expansion routine 26 has been initialized at block 150, the microprocessor proceeds to block 260. If the microprocessor 19 determines at block 260 that the initialization of the Expansion routine 26 has failed, the microprocessor proceeds to block 262 to call the routine depicted in FIG. 13 to terminate the expansion routine. More particularly, as shown in FIG. 13, the microprocessor at a block 264 saves current jobs on the expansion queue to a file. The microprocessor at block 266 then terminates services for the Expansion routine 26 and at block 268 kills the processing timer for the Expansion routine, exiting at block 270. If the microprocessor determines at block 260 that the initialization of the Expansion routine 26 has been successful, the microprocessor proceeds to block 272 to process any expansion messages. The microprocessor at block 274 determines whether a terminate message has been received and if not, the microprocessor continues to process messages at block 272.

Figure 12:
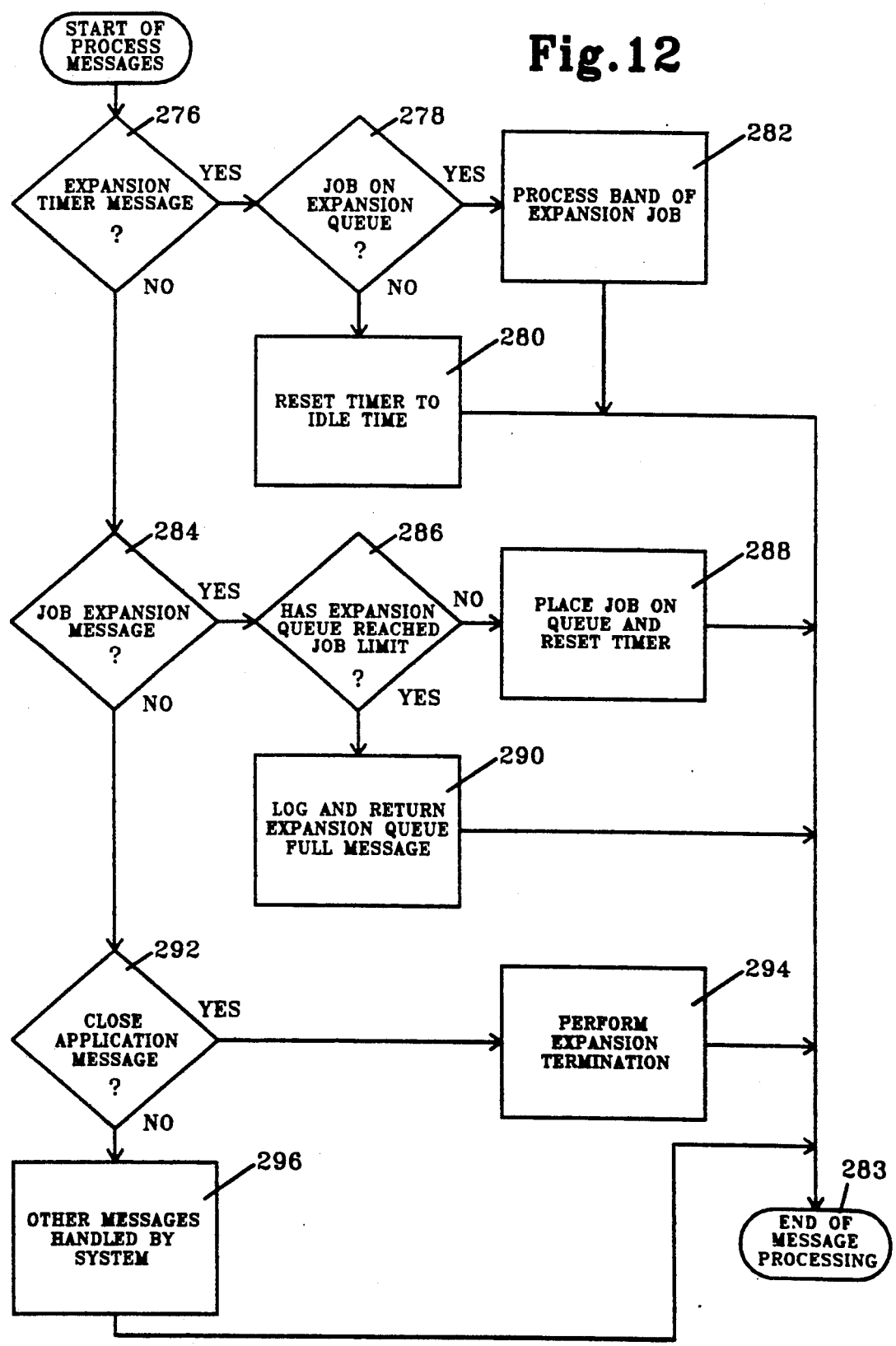
FIG. 12 is a flow chart illustrating an expansion process messages routine.

The microprocessor 19 processes expansion messages in accordance with the routine depicted in FIG. 12. Upon entering the routine, the microprocessor 19 at block 276 determines whether an expansion timer message has been received and if so, the microprocessor proceeds to block 278 to determine whether there are any jobs on the expansion queue. If there are jobs on the expansion queue, the microprocessor proceeds to block 282 to implement the routine depicted FIG. 14. If there are no jobs on the expansion queue, the microprocessor at block 280 resets the expansion timer to idle time and exits the routine at block 283. If the microprocessor determines that the expansion timer message was not received but that a job expansion message has been received, the microprocessor proceeds from a block 284 to a block 286. The microprocessor at block 286 determines whether the expansion queue has reached its limit for holding jobs and if not, the microprocessor proceeds to block 288 to place the job identified in the job expansion message on the expansion queue. The microprocessor at block 288 also resets the expansion timer, the microprocessor then exiting the routine at block 283. If the microprocessor determines at block 286 that the expansion queue has reached its limit, the microprocessor at block 290 logs this event in the expansion journal and returns to the calling routine with a message indicating that the expansion queue is full. If the microprocessor 19 determines at block 292 that a close application message has been received, the microprocessor proceeds to block 294 to implement the expansion termination routine depicted in FIG. 13 as discussed above. Otherwise, the microprocessor proceeds to block 296 to handle other miscellaneous expansion messages.

Figure 14:
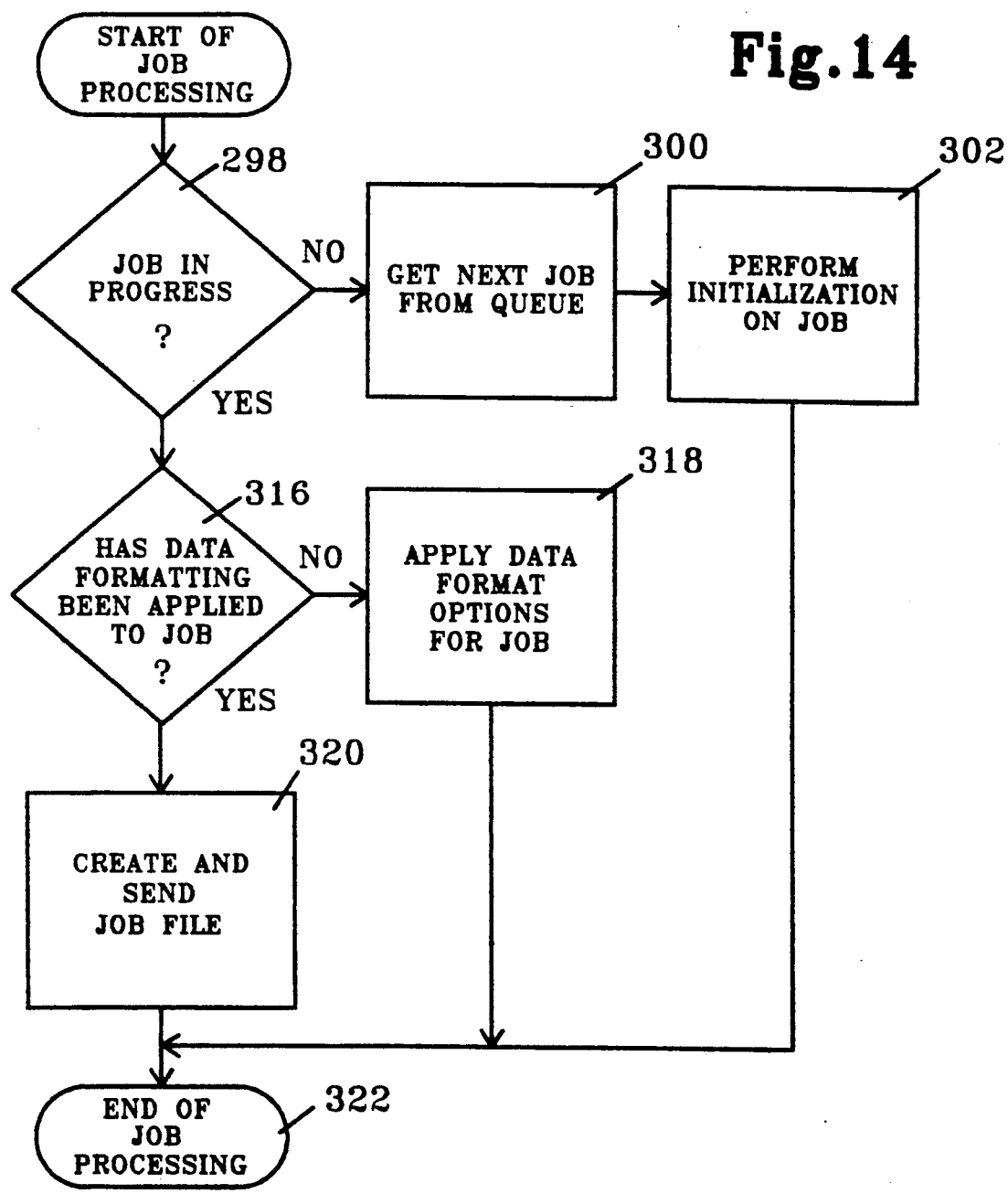
FIG. 14 is a flow chart illustrating an expansion process band of job routine.
Figure 16:
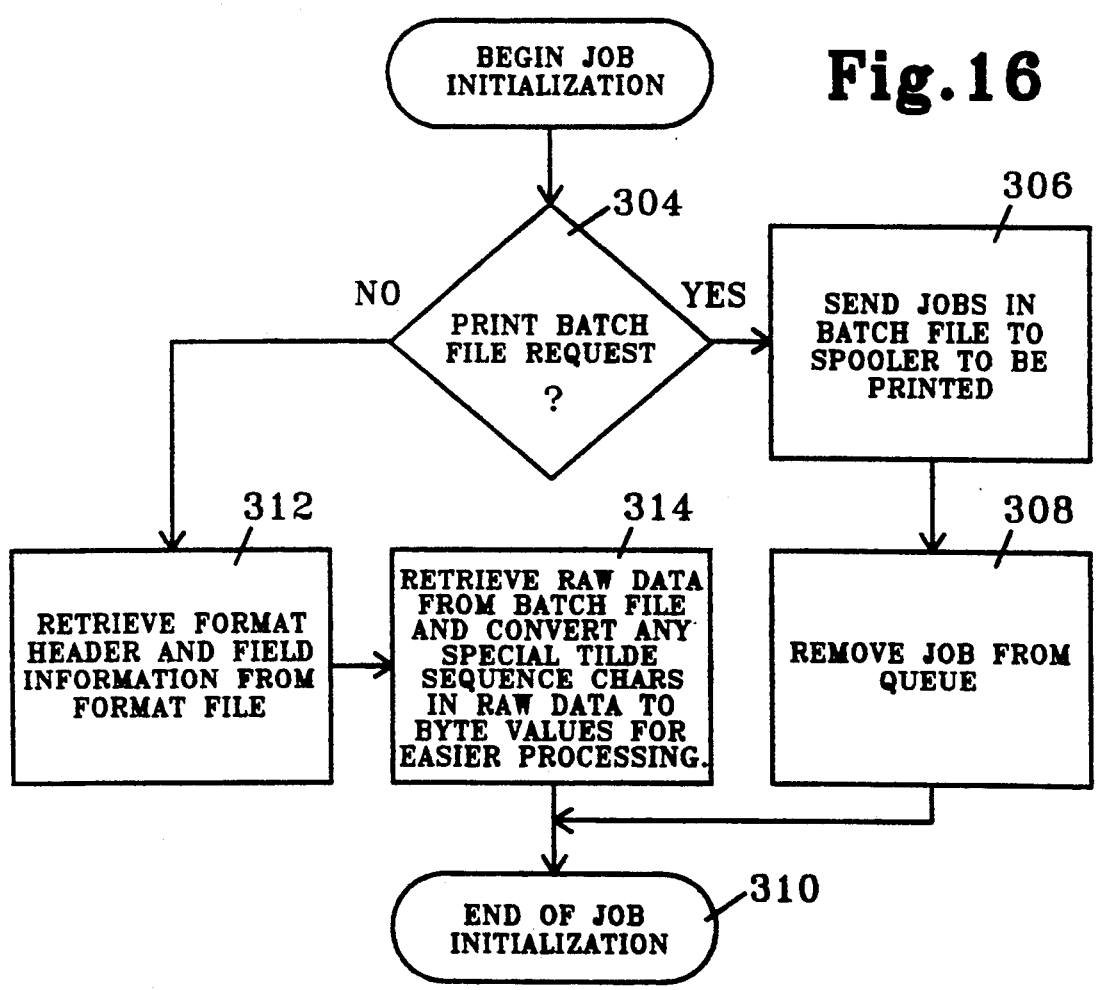
FIG. 16 is a flow chart illustrating a perform initialization on expansion job routine.

When the expansion timer has expired and there is a job on the expansion queue, as determined by the microprocessor at blocks 276 and 278, the microprocessor calls the routine depicted in FIG. 14. Upon entering this routine, the microprocessor at block 298 determines whether there is a job in progress and if not, the microprocessor at block 300 gets the next job from the expansion queue. Thereafter, the microprocessor performs the initialization on the job at block 302, the initialization procedure being depicted in FIG. 16. Upon entering the job initialization routine, the microprocessor 19 at block 304 determines whether a print batch file request has been received and if so, the microprocessor proceeds to block 306. At block 306 the microprocessor 19 sends the jobs in a batch file to the spooler 28 to be printed and a block 308 the microprocessor removes the job from the expansion queue. Thereafter, the microprocessor 19 exits the initialization job routine at a block 310. If the microprocessor determines at block 304 that a print batch file request has not been received, the microprocessor at block 312 retrieves the format header and field information from the format file for the job. Thereafter, the microprocessor at block 314 retrieves the raw data from the batch file and converts any tilde sequence characters that are represented in raw data to byte values for easier processing thereof. The microprocessor then exits the job initialization routine at block 310.

Returning to FIG. 14, if the microprocessor determines at block 298 that a job is not in progress, the microprocessor proceeds to block 316. At block 316 the microprocessor 19 determines whether data formatting has been applied to the job and if not, the microprocessor at block 318 calls the routine depicted in FIG. 15 as discussed in detail below. If the data formatting has been applied to the job, the microprocessor proceeds from block 316 to block 320 to create and send the job file to the spooler 28 as discussed in detail below with reference to FIG. 21.

Figure 15:
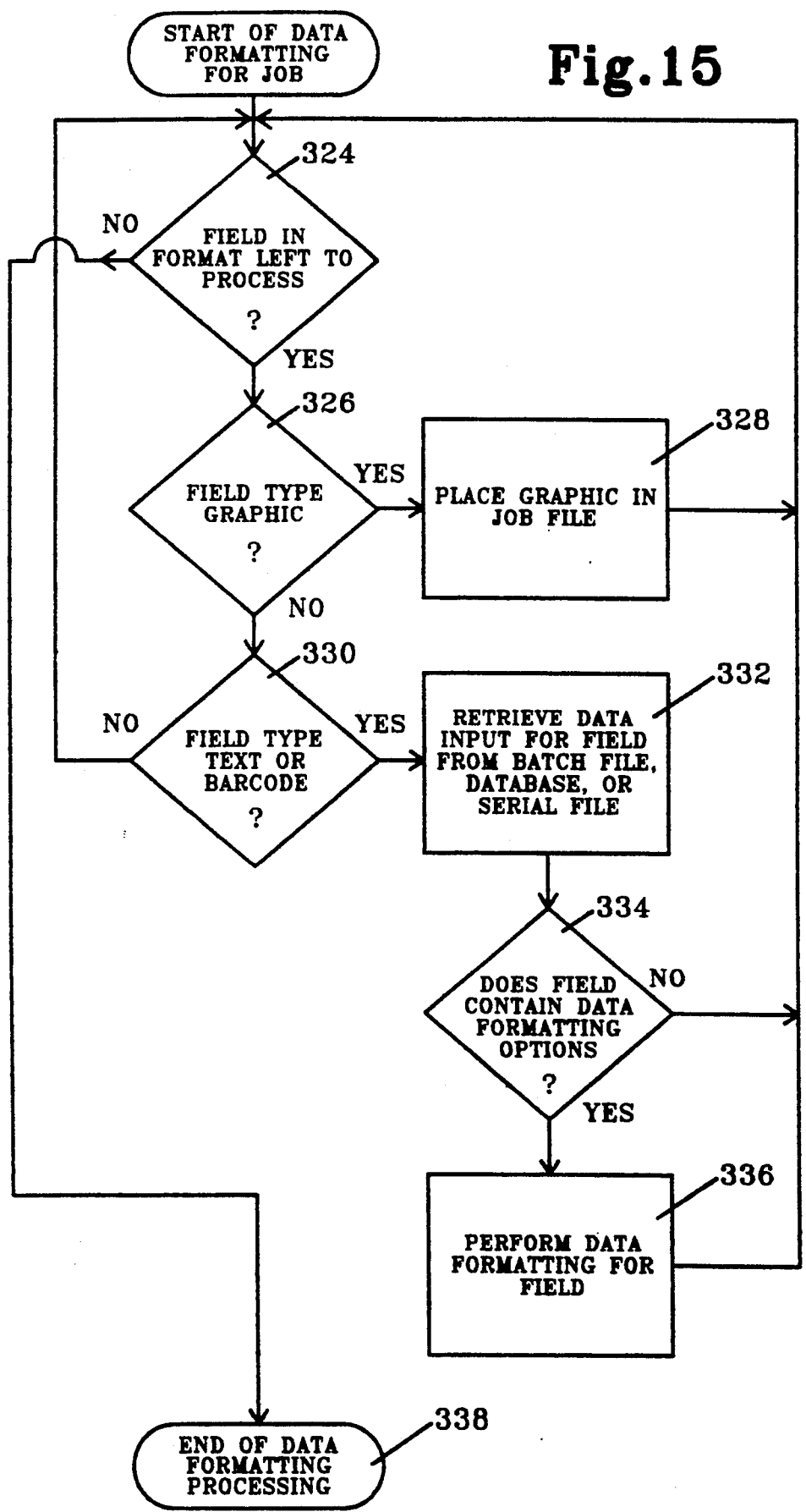
FIG. 15 is a flow chart illustrating an apply data format options for job routine.

The software routine called at block 318 is depicted in FIG. 15. Upon entering the routine, the microprocessor 19 at block 324 determines whether there are any fields in the job's format left to process and if so, the microprocessor proceeds to block 326. Otherwise, the microprocessor exits the routine at block 338, At block 326 the microprocessor 19 determines whether the field is a graphic field and if so, the microprocessor at block 328 places the graphic into the job file. From block 328 the microprocessor loops back to block 324. If the microprocessor determines at block 330 that the field is a text or a barcode, the microprocessor proceeds to block 332. At block 332 the microprocessor 19 receives the data input by the user for the field from the batch file, database or a serial file. Thereafter, the microprocessor at block 334 determines whether the field contains data formatting options and if so, the microprocessor performs data formatting for the field in accordance with the routine depicted in the flow charts of FIGS. 17A and 17B.

Figure 17A:
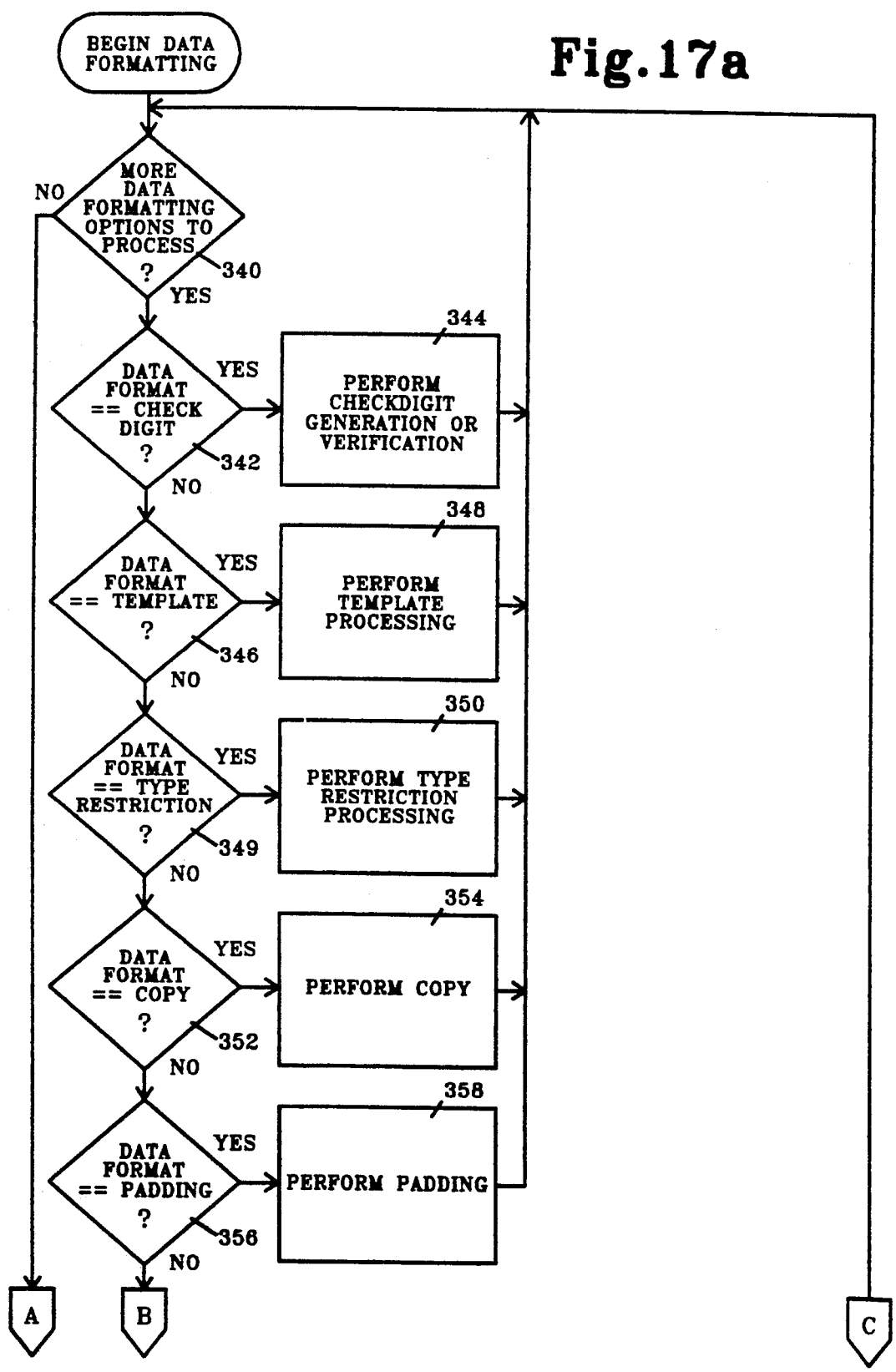
FIG. 17A and B form a flow chart illustrating a perform data formatting for fields routine.

Upon entering the data formatting routine depicted in FIGS. 17A and B, the microprocessor at a block 340 determines whether there are any more data formatting options to process. If so, the microprocessor proceeds to block 342 to determine whether the data format option to be processed is a check digit. If the data format option to be processed is a check digit, the microprocessor proceeds to block 344 to perform check digit generation and verification. Thereafter, the microprocessor loops back to block 340. If the data format option to be processed is a template, the microprocessor proceeds to block 348 to process the template in accordance with the routine depicted in FIG. 18. If the microprocessor determines at block 349 that the data format option to be processed is a type restriction option, the microprocessor at block 350 performs the type restriction processing in accordance with the routine depicted in FIG. 19. If the data format option to be processed is the copy option as determined at block 352, the microprocessor performs the copy processing at block 354. Similarly, if the microprocessor at block 356 determines that the data format option to be processed is the padding option, the microprocessor 19 at block 358 performs the padding process. If the microprocessor at block 341 determines that the data format option is an increment/decrement option, the microprocessor proceeds to block 343 to mark the field as active so that the increment/decrement rules will be sent to the printer. Thereafter, the microprocessor at block 345 determines whether this is an input from a serial file and if so, the microprocessor at block 347 performs incrementing or decrementing with regard to the file, the microprocessor thereafter returning to block 340. If the microprocessor determines at block 351 that the data format option to be processed is a cost code translation, the microprocessor at block 349 performs the cost code translation and thereafter returns to block 340. When the microprocessor at block 340 determines that there are no more data formatting options to process, the microprocessor proceeds to block 355 to implement the expand data validation routine as depicted in FIG. 20. Thereafter, the microprocessor 19 exits the routine at block 357.

Figure 18:
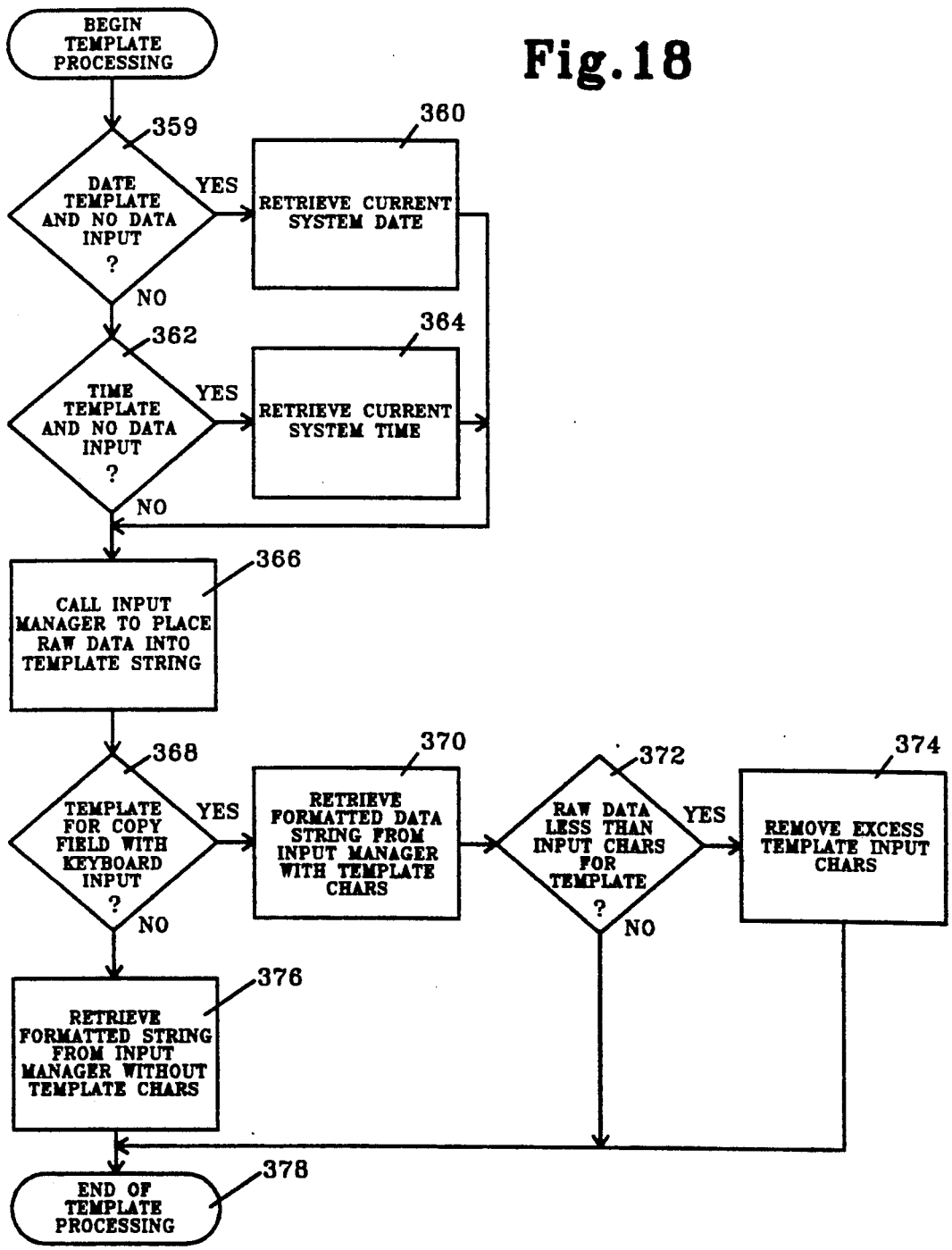
FIG. 18 is a flow chart illustrating a perform template processing routine.

Upon entering the template processing routine depicted in FIG. 18, the microprocessor at block 359 determines whether the template to be processed is a date template and further determines whether there is any data input. If the template is a date template having no data input, the microprocessor proceeds to block 360 to retrieve the current system date for the template. If the microprocessor at block 362 determines that the template is a time template having no data input, the microprocessor proceeds to block 364. At block 364 the microprocessor 19 retrieves the current system time for the template. At block 366, the microprocessor calls an input manager routine to place the raw data into the template string. Thereafter, at block 368 the microprocessor determines whether the template is for a copy field accompanied by a keyboard input. If so, the microprocessor at block 370 retrieves the formatted data string from the input manager with the template characters. Thereafter, the microprocessor determines at block 372 whether the raw data retrieved is less than the number of input character positions for the template and if so, the microprocessor at block 374 removes the excess template input characters. If the microprocessor determines at block 368 that the template is not for a copy field with a keyboard input, the microprocessor proceeds to block 376 to retrieve the formatted string from the input manager without template characters. Thereafter, the microprocessor exits the routine at block 378.

Figure 19:
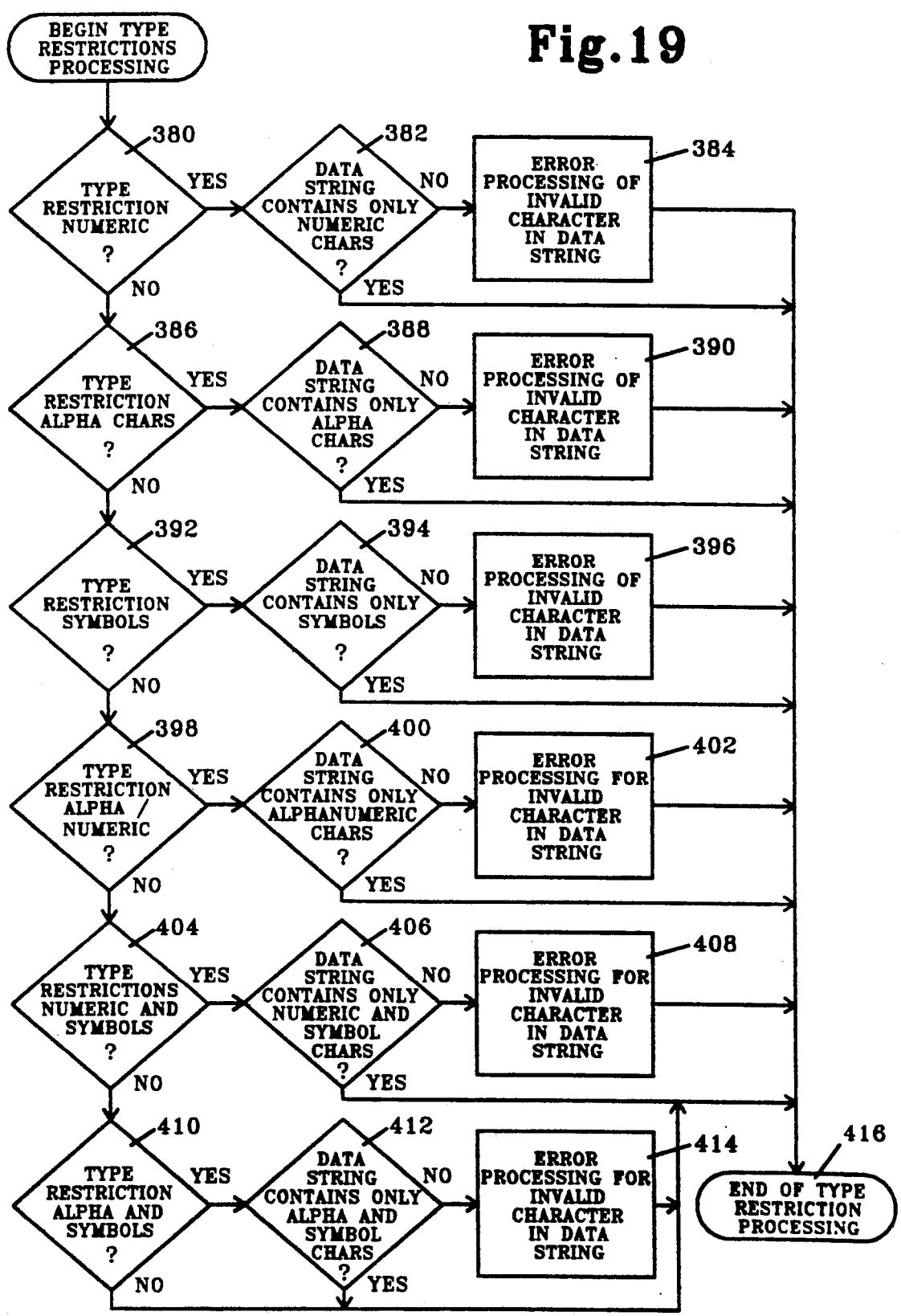
FIG. 19 is a flow chart illustrating a type restrictions processing routine.
Figure 20:
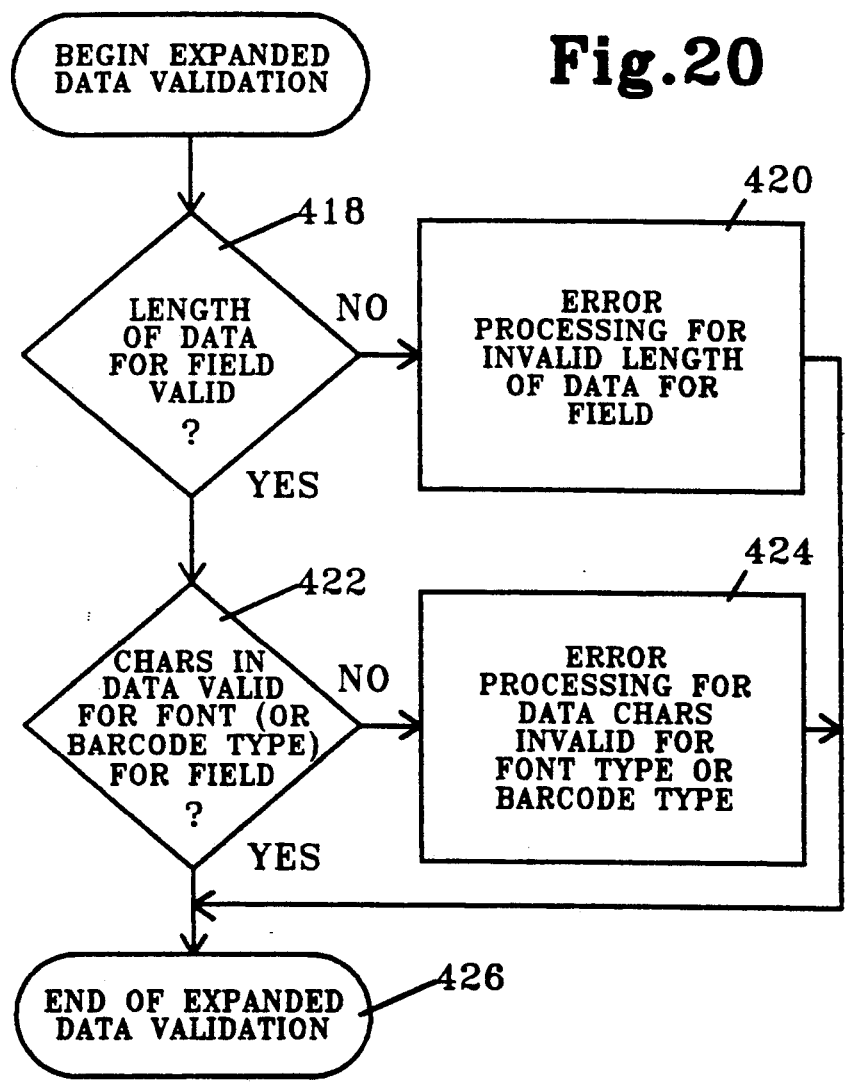
FIG. 20 is a flow chart illustrating an expanded data validation routine.

Upon entering the routine depicted in FIG. 19 for processing type restrictions, the microprocessor at a block 380 determines whether the type restriction is numeric and if so, the microprocessor proceeds to block 382 to determine whether the data string input by the user contains only numeric characters. If the data string does not contain only numeric characters, the microprocessor at block 384 implements error processing for invalid characters in a data string, the microprocessor exiting the routine depicted in FIG. 19 at block 416. If the microprocessor determines at block 386 that the type restriction to be processed is an alpha character type restriction, the microprocessor proceeds to block 388. At block 388 the microprocessor determines whether the data string entered by the user contains only alpha characters and if not, the microprocessor at block 390 implements the error processing of invalid characters in a data string. If the microprocessor determines at block 392 that the type restriction is a symbol type restriction, the microprocessor proceeds to block 394. At block 394 the microprocessor determines whether the entered data string contains only symbols and if not, the microprocessor at block 396 implements error processing of invalid characters in a data string. If the microprocessor determines at block 398 that the type restriction is an alpha/numeric type restriction, the microprocessor proceeds to block 400. At block 400 the microprocessor determines whether the data string contains only alphanumeric characters and if not, the microprocessor proceeds to block 402 to implement the error processing for invalid characters in a data string. If the microprocessor determines at block 404 that the type restriction is a numeric and symbol type restriction, the microprocessor proceeds to block 406. At block 406 the microprocessor determines whether the entered data string contains only numeric or symbol characters. If not, the microprocessor proceeds to block 408 to implement the error processing for invalid characters in a data string. If the microprocessor determines at block 410 that the type restriction to be processed is an alpha and symbol type restriction, the microprocessor proceeds to block 412. At block 412, the microprocessor determines whether the data string contains only alpha or symbol characters and if not, the microprocessor at block 414 implements the error processing for invalid characters in a data string.

Upon entering the expand data validation routine depicted in FIG. 20, the microprocessor at block 418 determines whether the length of data for a given field is valid. If not, the microprocessor at a block 420 performs error processing for an invalid length of data for a field. If the microprocessor at block 422 determines that the characters in the data field are not valid for the font or barcode type specified for the field, the microprocessor proceeds to block 424 to perform error processing for data characters that are invalid for the specified font type or barcode type. Thereafter, the microprocessor exits the routine at block 426.

Figure 21:
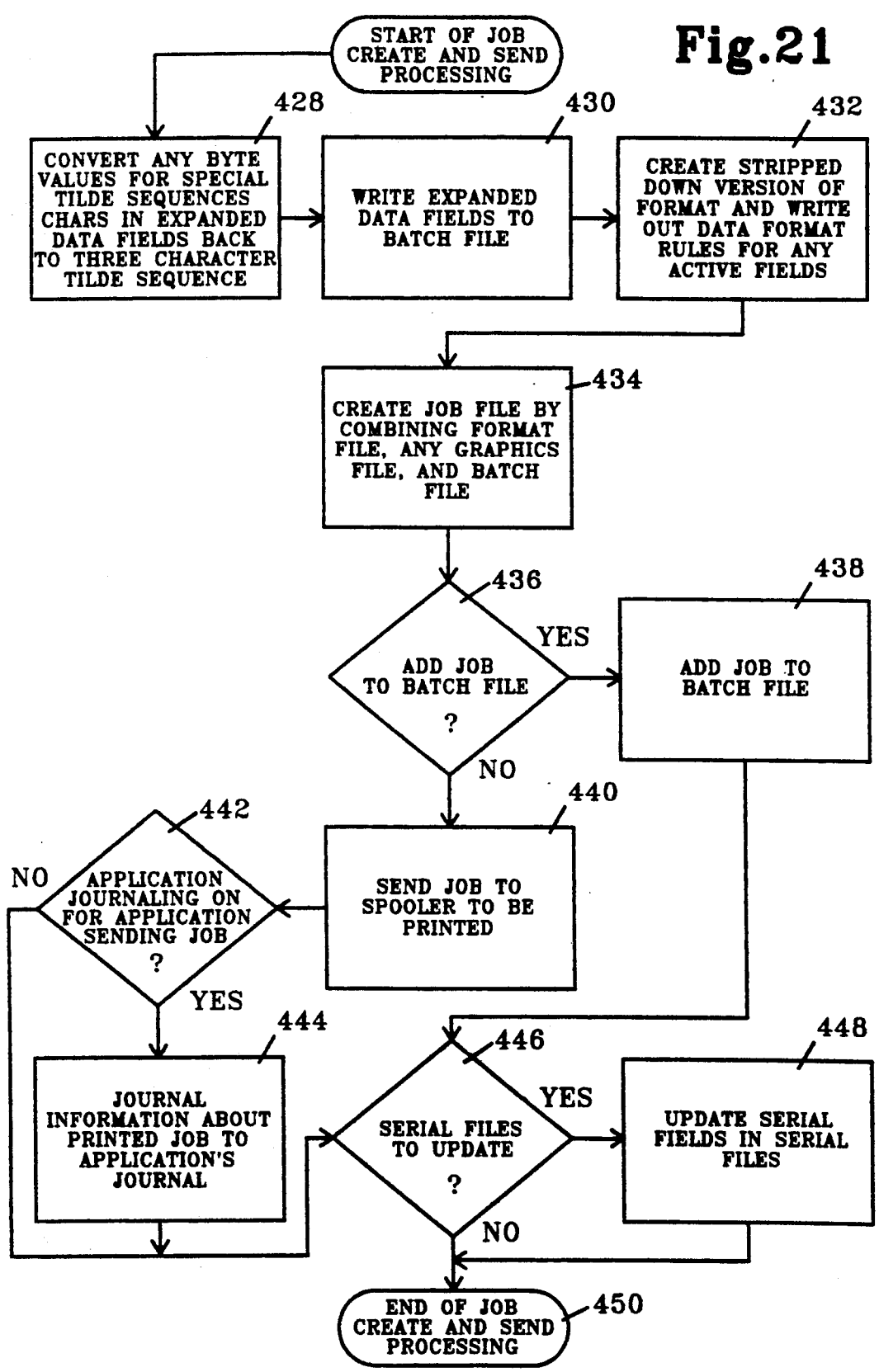
FIG. 21 is a flow chart illustrating a create and send expansion job routine.

Upon entering the routine depicted in FIG. 21 to create and send an expansion job to the spooler 28, the microprocessor at block 428 converts any byte values for special tilde sequence characters in an expanded data field back to the three character tilde sequence entered by the user. Thereafter, the microprocessor at block 430 sends the expanded data field to a batch file. The microprocessor 19 at block 342 creates a stripped down version of the format specified for the job and writes out the data format rules for any active fields. At block 434 the microprocessor creates a job file by combining the format file, graphics file and batch file. Thereafter, the microprocessor 19 determines at block 436 whether the job is to be added to a batch file and if so, the microprocessor proceeds to block 438 to add the job to a batch file for storage. If the job is not to be added to a batch file, the microprocessor proceeds from block 436 to block 440. At block 440 the microprocessor 19 sends the job to the spooler 28 so that the spooler may transmit the job to a printer 10, 11, 12 or 13 to be printed. From block 440, the microprocessor proceeds to block 442 to determine whether application journaling is on the software module sending the job. If so, the microprocessor 19 proceeds to block 444 to log information about the printed job to the application's journal. From block 442, the microprocessor proceeds to block 446 to determine whether there are serial files to update and if so, the microprocessor at block 448 updates the serial files. The microprocessor exits the routine depicted in FIG. 21 at block 450.

Figure 22:
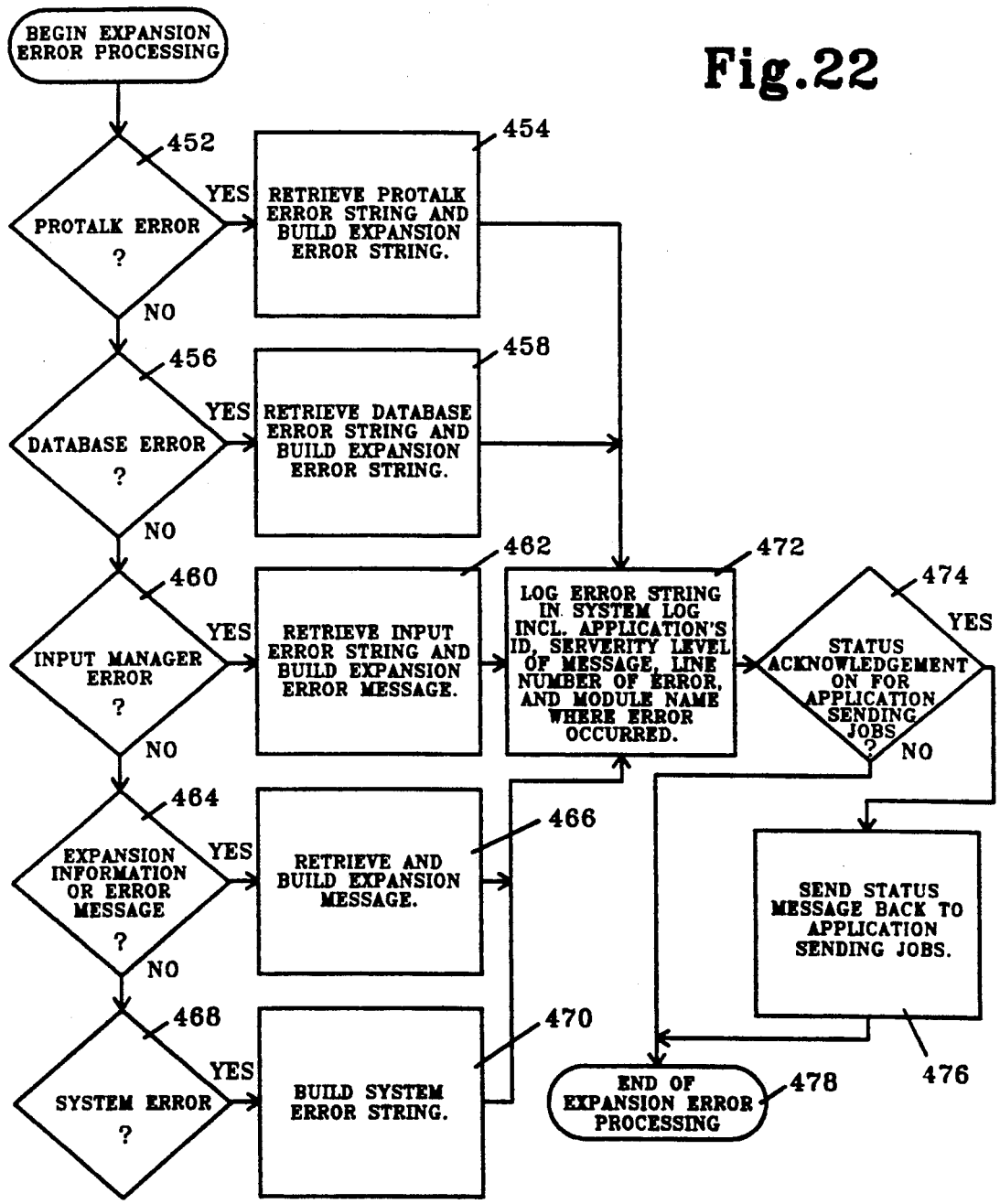
FIG. 22 is a flow chart illustrating an expansion error processing routine in accordance with the present invention.

Upon entering the routine depicted in FIG. 22, the microprocessor at block 452 determines whether there is a PROTALK error. PROTALK is the language in which format packets, data packets as well as graphic packets are created. PROTALK is a tag addressable language wherein each of the tags except for section and packet tags have a default value associated therewith. The PROTALK language is described in detail in the PROTALK specification set out in Appendix A. If the microprocessor 19 determines that a PROTALK error has occurred, the microprocessor at block 454 retrieves a PROTALK error string and builds and expansion error string. Thereafter, the microprocessor 19 proceeds to block 472. If the microprocessor determines at block 456 that a database error has occurred, the microprocessor at block 458 retrieves the database error string and builds an expansion error string, the microprocessor proceeding to block 472. If the microprocessor determines at block 460 that an input manager error has occurred, the microprocessor proceeds to block 462. At block 462, the microprocessor 19 retrieves the input manager error string and builds an expansion error message, the microprocessor thereafter proceeding to block 472. If the microprocessor determines at block 464 that an expansion error message has occurred, the microprocessor proceeds to block 466 to retrieve and build an expansion message. Thereafter, the microprocessor proceeds to block 472. If the microprocessor determines at block 468 that a system error has occurred, the microprocessor proceeds to block 470 to build a system error string. Thereafter, the microprocessor proceeds to block 472. At block 472 the microprocessor 19 logs the error string into the system log including the identity of the application in which the error occurred, the severity level of the error message, the line number in the application where the error occurred and the name of the module where the error occurred. Thereafter, the microprocessor 19 proceeds to block 474 At block 474, the microprocessor determines whether the status acknowledgement is on for the application sending the job and if not, the microprocessor exits the routine at block 478. If, however, the microprocessor 19 determines that the status acknowledgement is on, the microprocessor proceeds to block 476 to send a status message back to the application sending the job.

Many modifications and variations of the present invention are possible in light of the above teachings. Thus it is to be understood that, within the scope of the appended claims, the invention may be practiced otherwise than as described hereinabove.

APPENDIX A

PROTALK Specification

Document number: _____72132_____

Revision:

Date: October 16, 1991

PROTALK Speci          .1                                                    date 10, 16, 91

TABLE OF CONTENT

1 Introduction ............................................................................................................... 3
2 Scope ......................................................................................................................... 3
3 Syntax Overview ...................................................................................................... 4
    3.1 Information Outside of a Packet ................................................................... 6
    3.2 Packet Content .................................................................................................. 7
        3.2.1 White-space and Comments ............................................................ 7
        3.2.2 String/Line Lengths ........................................................................... 7
        3.2.3 Tag Argument Construct ................................................................... 7
4 Tag Expressions ....................................................................................................... 9
    4.1 Format Definition ............................................................................................. 9
        4.1.1 Format Header ..................................................................................... 9
        4.1.2 Standard Output Descriptions ......................................................... 12
        4.1.3 Field Contents: Standard expressions (available on all fields) ...... 16
        4.1.4 Field Contents: Text & Bar Code standard expressions ................. 18
        4.1.5 Field Contents: Text fields only ....................................................... 30
        4.1.6 Field Contents: Bar Code fields only .............................................. 32
        4.1.7 Field Contents: Interactive fields only ............................................ 35
        4.1.8 Field Contents: Line fields only ...................................................... 35
        4.1.9 Field Contents: Box fields only ....................................................... 36
        4.1.10 Field Contents: Graphic fields only .............................................. 38

4.2 Batch Definition ......... 39
        4.2.1 Batch Header ......... 39
        4.2.2 Standard Output Descriptions ......... 41
        4.2.3 Text and Bar Code Data ......... 41
    4.3 Graphic Definition ......... 43
        4.3.1 Graphic Data ......... 43
        4.3.2 Graphic Data Encoding ......... 45
    4.4 Cost Code Table ......... 47
    4.5 Check Digit Table ......... 48
    4.6 Control Messages ......... 49
    4.7 Data Download ......... 52
    4.8 Software Download ......... 53
    4.9 Data Base Control ......... 54
5 Internal PROTALK Design ......... 55
    5.1 Data Sequencing Overview ......... 55
        5.1.1 Parser Design ......... 55
        5.1.2 Data Formatting ......... 56

1 Introduction

This document describes the internal data structure, it's processing and meaning for the PROfessional Tag Addressable Language Kernel (PROTALK).

PROTALK is the internal language of the PROLAB project. The language was designed as a vehicle to describe all the features of a price marking printer; making PROLAB independent of the printer design. The building blocks given by PROTALK allow PROLAB to generate the proper message packets to operate Monarch's 9401/02, 94x5, etc.

PROTALK's primary design is for online operation. However, its capabilities encompass both online and offline operation. Formats created offline can be used online and visa versa.

PROTALK is not intended to replace MPCL. It is an internal data structure only.

2 Scope

This document covers the PROTALK language in detail. The information is intended for the online designer, technical documentation as well as a reference document. Since the scope is so broad, some information may not be of interest to the reader and can be ignored.

There should be no assumptions made from past Monarch printers as to the design or implementation of PROTALK. The specification is intended to encompass all issues and implementations. If any item is ambiguous or unclear, make it known and the specification will be changed to better explain the feature.

Hardware specific options are also included within PROTALK. These tags are noted and should only be used when compatibility between products is not a concern. The use of these tags may result in incompatible message packets with printers that have different hardware configurations.

3 Syntax Overview

Several terms are used in the following sections that need to be defined before looking at the actual PROTALK syntax. These tokens are the building blocks of the language.

white-space

CR (Carriage Return), LF (Line Feed), SPACE (32 dec.) and TAB (09 dec.) characters.

ASCII char

Any printable ASCII character (32 < = char < = 126 dec).

Only ASCII characters and white-space characters can be sent to the printer as part of the data stream.

tag

Any two character PROTALK instruction (listed below).

expression

Tag and its assignment expression (string, real, numeric or ASCII character data)

string data
name data

A sequence of ASCII characters enclosed by double quote '"' characters. To embed a " (double quote) or a non-printing character in string data, precede it with a tilde (<tilde>ddd where ddd is its decimal equivalent).

Embedded white-space is stored for both named and string data. Named data is also case sensitive.

real data

Unsigned size data reflecting linear units and expressed in a *Floating Point* format. For example 1.224.

| range: | Inch | Metric | Dots |
|---|---|---|---|
| | 0 to 13.33 | 0 to 33.86 | 0 to 8000 |

All metric units are expressed in centimeters.

Real data is truncated to the nearest .0015 of an inch which is fine enough to support 600DPI.

numeric data

Signed and unsigned integer data (-9999 to +9999, "+" optional).

packet record

A set of expressions followed by a "|" record terminator character. The "|" terminates the current record and begins the definition of the next record.

comment

A string of ASCII characters starting with the "#" character and terminated by a "|", "#", CR or LF character.

The "|" is optional but recommended between field definitions.

Throughout the specification whenever a real value is syntactically expressed, such as d.dd, it implies that the value specified is in inches. When centimeters or dots are selected, the syntax can be varied to agree with these units.

PROTALK's syntax uses a free format ASCII message packet architecture. The structure can be broken up into 1) Information outside of a packet and 2) Packet content.

3.1 Information Outside of a Packet

White-space and comments embedded between message packets are always ignored by the printer.

If anything else appears between message packets, the printer will either ignore the data (if *Attention Mode*[1] is OFF) or display a warning message (if *Attention Mode*[1] is ON). In either case, any data between message packets will not affect the data acted upon by the printer.

Anything, besides handshake characters and the Packet Start character, sent between message packets is for documentation only. It will not be stored by the printer.

[1] *Attention Mode* sequencing is currently undefined.

3.2 Packet Content

A message packet has three major building blocks. The *Packet Start* character, *Packet Records* and the *Packet Terminator* character.

```
{                       - Packet Start character
packet records |        - Packet Records (described below)
}                       - Packet Terminator character
```

3.2.1 White-space and Comments

White-space can generally be placed freely within the message packet. The only exception is for string data. Here, the characters will be stored as part of the string's content.

Comments can be placed before, between or after tag expression constructs. Note that it is important to ensure that each comment is properly terminated. If not, the next expression could be ignored as part of the comment.

3.2.2 String/Line Lengths

PROTALK supports strings that can exceed 132 characters in length which is impossible for some host systems. To accommodate this, a string concatenation feature has been built into PROTALK which will allow a string to be sent in multiple "lines". For example:

```
ND = "FIELD1,This data string is so long that it needs two lines to contain it all. To"
     " separate it, simply end with a double quote and then start the next string."
```

Optional white-space separates the two parts of the string. The two successive double quote characters force the concatenation to take place.

String data can be from 0 to 200 characters in length. Named Field Data (as shown in the above example) is the one exception to this rule. The total string length includes the 12 character name, a comma and the 200 character data string; for a total of 213 characters.

3.2.3 Tag Argument Construct

A tag expression consists of a 2-character tag sequence followed by an assignment expression. For example:

| tag | assignment | expression | terminator |
|---|---|---|---|
| FT | = | "Format 1" | ; |

NOTES:

o Tags may be given in upper or lower case.

o The assignment operator (" = ") is required.

o White-space may precede or follow the assignment operator.

o If the tag is given alone, a default, specific to that individual tag, will be substituted.

o Multiple occurrences of a tag construct will overwrite previous settings except for the repeated tags mentioned in section 5.1.2. No error will result whether Attention Mode is ON or OFF.

o Tag expressions may be separated by whitespace or a comma.

o The terminator is not required but is recommended to improve readability of the entire packet.

4 Tag Expressions

This section describes each tag expression available through PROTALK. Every design will implement each tag identically or not at all. Any omissions or deviations must be documented as part of the project's specification.

Each message packet, of the same type, to be _stored_ in the printer is uniquely named (by the FT, BH, GR, CT, CA, DR or SO tag). If a message packet specifies the same name as one already loaded, the new packet will overwrite the current information stored in the printer. No error will result but the printer will guarantee that the data being overwritten is not required prior to the overwrite. In this case, the operator will be notified that the data will not be stored until the operation completes on the packet which is going to be overwritten.

4.1 Format Definition

A format is required to print a ticket on the printer. It specifies the content and orientation of each field desired. The format is uniquely named and referenced by batches which actually give the data to be printed.

The format message packet consists of a Format Header followed by from 0 to 99 Field Definitions. The Format Header consists of the overall controls to describe what to do with the format and the Field Definitions describe in detail the type, location and formatting options desired.

> NOTE:
>
> The only time a format may be used without any Field Definitions is for upload.
>
> PROTALK does not offer a format modify option. The entire format must be downloaded in a single message packet every time it changes.

The number of fields that can be handled by the printer is printer specific. These could consist of user formats, ROMed formats, formats on disk, etc.

4.1.1 Format Header

Format Name
 Syntax: FT = "name"
 Options: 1 to 12 characters

The format name and its expression are required to uniquely identify the format. It is used to associate a batch with its format.

The only time that the format name can be NULL is for upload. The missing name will cause ALL formats to be uploaded.

Disposition
 Syntax: DP = L/U/R/P
 Options: Load, Upload, Remove or Print

The disposition dictates what action will be performed by the message packet. The expressions have the following meaning:

Load

> The Load disposition specifies that the packet is to be loaded into the printer without printing. This is the default mode of operation for every message packet except for batches.

Upload

> If only the Format Name and Upload disposition is given, the named format (or all if a NULL name is given) will be sent back to the host.
>
> When cloning or uploading a message packet the printer will insert the Load disposition; even when uploading batch packets.

Remove

> If only the Format Name and Remove disposition is given, the named format (or all if a NULL name is given) will be deleted.

Print

> This option is only available for batch message packets. Its use is documented in section 4.2.1.

Alternate Device
Syntax: AD = A-C/D/F/M/N/R/T/U
Options: refer below

The alternate device indicates where the data is to be placed or already resides. The expressions break out as follows:

Device A-C

> An A-C device specifies that the format is to be loaded to device A, B or C, respectively (normally viewed as a disk drive).

Data Base

> This expression is for HOST use only. It is not supported by the printer. See PLPLATFORM documentation for its meaning.

Fixed ROM

> The Fixed ROM device causes the printer to scan all ROM installed for the data requested.
>
> The option can only be used when searching for data. Nothing can be stored into ROM directly.

Memory Card

> Memory Cards can be either ROM or RAM cards which are operator changeable. Data can be both stored and retrieved from these cards provided the hardware is capable of the operation needed.

Non-volatile RAM

> Non-volatile RAM is typically battery-backed RAM within the printer. Data is maintained from power down to power up. Data can be both stored and retrieved from this device.

Ram (Volatile Ram)

> This is identical to the Non-volatile RAM except that the data is not preserved when power is turned off.

Temporary

> The temporary device only applies to format and graphic message packets. A format loaded to the temporary device is available until overwritten or power is turned off.

User Rom

> This option is for Monarch RPQ use only.

If device is not specified (or tag given without an expression), the printer will store the data to its default device (RAM). When searching for a packet (for upload as an example) and the device tag is not used, the printer will search all devices for the requested data. This search sequence is the same sequence as the expressions given above. If the device tag is given, only that device is searched for the requested data.

It is strongly recommended that the device tag only be used when absolutely necessary. This tag is printer and hardware specific and should only be used when conflict between using the same message packets between products is not a concern. The printer will normally handle the message packet correctly for its particular configuration WITHOUT a device tag.

If the specified device is not available and *Attention Mode* is ON, a warning will be displayed to the operator.

Units
   *Syntax:* UT = E/M/D
   *Options:* English, Metric or Dots

All real data (position values, lengths, widths, etc) can be given in inches, centimeters or dots. However, once specified in the Units tag, all values within the message packet must be in that base. The default if the tag is not given (or tag given without an expression) is English.

The parser will accept up to four digits before the decimal point and up to four following the decimal point. However, the actual range of the values cannot exceed that mentioned in section 3 above.

Specifying Dots is not recommended since it will make the packet dependent on the resolution of the printer and portability may be lost.

Stock Length
   *Syntax:* SL = d.dd
   *Options:* Value is printer specific

The Stock Length gives the printer the only stock length that should be used to print the format. If that particular length is not installed when the format is ready to print, the printer will prompt the operator to load the stock prior to continuing The default length, if the tag or its expression is not given, is the current stock installed in the printer. In essence, the tag is not needed if the same stock is always used.

> NOTE:
> The actual calibrated stock length can be as much as .25 inch different than the specified length and the printer will accept it as the same length. This allows for stock production inaccuracies.

Since this tag is printer specific, the use of it should be restricted so compatibility problems between products don't arise.

Stock Width
   *Syntax:* SW = d.dd
   *Options:* Value is printer specific

The Stock Width gives the printer the only stock width that should be used to print the format. If that particular width is not installed when the format is ready to print, the printer will prompt the operator to load the stock prior to continuing.

The default width is the same as the head width (which is fixed for a particular printer) In essence, the tag is not needed if there is no reason to limit data widths narrower than the head width. The only exception to this is if the NP tag is given. In this case, the actual stock width is needed for the printer to properly divide the stock into equal parts.

> NOTE:
>> If the printer doesn't have a stock width sensor and the width is too narrow, no error will result and a bad ticket may result if the field images off the ticket.

Since this tag is printer specific, the use of it should be restricted so compatibility problems between products don't arise

4.1.2 Standard Output Descriptions

Cut

*Syntax:* CU = B/A/E
*Options:* (Before, After or at End of Batch)

If the printer has a knife, this tag instructs the printer where to cut; as follows:

> NOTE:
>> Cutting is based on a "strip" which may be one or more tickets depending on the cut multiple (described later).

Before
> The printer will cut each strip before beginning the next strip. The last strip is left in the machine uncut.
>
> This is the printer's normal cut operation. With the last ticket left in the printer, no stock will be wasted between batches. However, when mixing batches with and without cutting, the cut key will have to be used to separate the batches.

After
> The printer will cut each strip after it is printed. This will produce an area on the lead edge of the ticket that cannot be printed on since the ticket must be overfed to align the end of the ticket at the knife.
>
> The actual amount of the overfeed is printer specific. Therefore, the use of this option should be restricted so compatibility problems between products don't arise.

End of batch
> This option will cut before the first ticket of the batch and then print the remainder of the batch without cutting.

If cut is not specified (or tag given without an expression), the printer will default to no cutting. Likewise, if the tag is received and the printer has no knife or cannot cut because the wrong stock is loaded, the tag will be ignored (no cut). The latter will give a warning if *Attention Mode* is ON.

NOTE:
> The printer may waste a ticket between batches that switch between cut modes.

Cut Multiple
*Syntax:* CM = nnn
*Options:* 1 to 999

This option can follow the CU tag to specify that strips of tickets are to be produced between cuts.

If cut multiple is not specified (or tag given without an expression), the printer will default to a multiple of 1; cutting each ticket.

If the printer doesn't have a knife and *Attention Mode* is ON, a warning will be displayed to the operator.

NOTE:
> There is no relationship between cut and print multiples. They may be used together in the same format to produce a wide variety of print and cut combinations.

Print Multiple
*Syntax:* PM = nnn
*Options:* 1 to 999

This option allows multiples to be produced with the identical content printed on each.

The actual number of individual tickets produced is Print Multiple times Print Quantity. Further, if the batch contains data formatting tags that normally occur between tickets (an incrementing field for example), the field will only change between multiples not individual tickets.

If a multiple is not specified (or tag given without an expression), the printer will default to a multiple of 1 (single ticket mode).

NOTE:
> There is no relationship between cut and print multiples. They may be used together in the same format to produce a wide variety of print and cut combinations.

Number of Parts
*Syntax:* NP = n
*Options:* 1 to 5

An entire image may be horizontally replicated across a ticket up to five times with the Number of Parts tag. The printer will automatically ensure that the fields don't get overlaid when the data is replicated across the ticket.

If number of parts is not specified (or tag given without an expression), the printer will default to 1 part (single image mode).

Print Quantity
*Syntax:* PQ = nnnn
*Options:* 1 to 9999

The Print Quantity is the total number of sets of tickets to print. Generally all tickets will be produced. However, if the trigger control tags (FM and TS tags) are used or batch terminated by the operator through *Batch Control*, the actual quantity printed may be smaller than the quantity requested.

If a quantity is not specified (or tag given without an expression), the printer will default to 1 (single ticket).

Stock Rotation
*Syntax:* SR = nnn
*Options:* 0, 90, 180 or 270 (degrees)

The entire printed image can be rotated in 90 degree increments with respect to the ticket coming out of the printer. The programmer formats the ticket as though Stock Rotation is not specified.

The value given will be rounded to the nearest 90 degree increment.

For stock which is not square, stock rotation of either 90 or 270 degrees may produce errors because the unrotated data may no longer fit on the ticket.

If stock rotation is not specified (or tag given without an expression), the printer will default to 0 degrees (ticket readable as it exits the printer). If given, the expression will be rounded to the nearest 90 degree increment.

Stock Type
*Syntax:* ST = B/D/E
*Options:* Black Mark, Die Cut or Either This tag gives control over which stock sensor is required for the stock being used.

If stock type is not specified (or tag given without an expression), the printer will default to Either (the last selected stock sensor will be used). No prompting or calibration will be performed as long as the format length and width haven't changed since the last format was printed.

If the specified sensor is not installed in the printer and *Attention Mode* is ON, a warning will be displayed to the operator.

Feed Mode
*Syntax:* FM = C/D/U/T
*Options:* Continuous, On-Demand, On-Demand with Take-up or Trigger This tag selects the use of the optional on-demand or trigger feature. The expressions are treated as follows:

Continuous
      This is the normal and default mode of operation if the tag is not given, tag given without an expression or the required hardware to support the feature is not installed. The later will give a warning if *Attention Mode* is ON.

Tickets are produced without waiting on the demand sensor or trigger. The stock take-up will be turned off.

On-Demand
> This option will enable the on-demand feature. Between each <u>print multiple</u>, the printer will pause until the strip is removed from the printer or the TS command tag is received online. The take-up will be turned off and the trigger will be ignored.

On-Demand with Take-up
> This option will enable the on-demand feature and will also turn the take-up on so the backing paper can be rolled into the printer. The option can only be used on label stock.

On-Demand with Trigger
> This option will enable the trigger feature. Between each <u>print multiple</u>, the printer will pause until the trigger is pressed on the printer or the TS command tag is received online. The take-up will be turned off and the on-demand sensor will be ignored.

Since this tag is printer specific, the use of it should be restricted so compatibility problems between products don't arise.

Batch Separators
*Syntax:* BS = d.dd
*Options:* 0 for double length else length of separator (.002 to .50)

One of three types of batch separators can be produced with the Batch Separator tag.

> *Printed bar on last ticket of batch*
>> If the value given is less than or equal to .12in, the last ticket of the batch will have a printed bar on the trailing edge of the ticket of the length specified.
>>
>> This batch separator ticket is usable as long as the length of the printed bar didn't overlay printed data. If data is overlaid and *Attention Mode* is ON, a warning will be displayed to the operator.
>
> *Printed bar extending onto ticket of next batch*
>> If the value given is greater that .12in, the last ticket is printed without the bar. The next ticket however is overfeed d.dd - .12 and will contain the printed bar.
>>
>> This makes the first ticket of the next batch shorter than all other tickets of the next batch.
>
> *Double length separator*
>> If zero is given, a double length blank ticket will be produced (not cut) as the batch separator.

If the batch separator tag is not given (or tag given without an expression), no separator tag will be produced.

4.1.3 Field Contents: Standard expressions (available on all fields)

Each field in the format must begin with the FD tag which uniquely names the field in its respective format. Field names can be duplicated in different formats.

The FD is then followed immediately by the required tag to properly identify the type of field that is being defined (a list of these field tags is given in section 5.1.2).

The *Standard Argument* tags then normally follow. Any of the tags in this group can be used on any field being defined.

Field Name
  *Syntax:* FD = "name"
  *Options:* 1 to 12 characters

The FD tag <u>must</u> precede EVERY field in the format giving it a unique name. This name is used for any reference to the field.

Vertical Reference
  *Syntax:* VR = d.dd
  *Options:* 0 to stock length

The vertical reference defines the lower-left hand corner's y-coordinate of the field. This is the same reference used for rotations. With respect to the printer, the reference corresponds to the first dot row on the print head.

If vertical reference is not specified (or tag given without an expression), the printer will default to the last field's vertical position or zero for the first field.

Horizontal Reference
  *Syntax:* HR = d.dd
  *Options:* 0 to stock width

The horizontal reference defines the lower-left hand corner's x-coordinate of the field. This is the same reference used for rotations. With respect to the printer, the reference corresponds to the first dot on the print head.

If horizontal reference is not specified (or tag given without an expression), the printer will default to the last field's horizontal position or zero for the first field.

Overlay Type
  *Syntax:* OT = N/O/R
  *Options:* No-Print, Or or Replace content This tag controls how the data will be placed into the image buffer. These options are only useful when overlaying fields. Three options are available as follows:

No-Print
    No-print instructs the printer to fully build the string to be imaged, including any copies or formatting for the string, but not image. Therefore the field never prints.

The FS=" tag sequence should be used to select the field type of fields that do not print.

Or
    This option allows for logical ORing of the data into the image buffer.

Attempting to OR the data of a bar code field into the image buffer will likely produce a code which cannot be scanned.

Replace
> This is the default mode of operation. The data in the field is imaged directly over the top of any data imaged previously.

In general, overlaying fields is not recommended. The results are going to be printer specific since the printer's imaging software may be hardware or implementation limited.

4.1.4 Field Contents: Text & Bar Code standard expressions

The *Text & Bar Code standard expression* tags normally follow the Standard Arguments. However, these tags are only available when a text (FS field type tag given) or a bar code (BT field type tag given) field is being defined.

Field Rotation
   *Syntax:* FR = nnn
   *Options:* 0 to 359 (degrees)

The entire content of the field can be rotated about the lower-left hand corner (vertical and horizontal reference).

The amount of rotation is expressed in degrees but may be rounded by the printer to the nearest angle implemented on the printer. It is recommended that fields only be rotated in 90 degree increments. All implementations will support 90 degree increments of field rotation.

If field rotation is not specified (or tag given without an expression), the printer will default to zero degrees.

Prompt
   *Syntax:* PT = "string"
   *Options:* 1 to 80 characters

This tag gives the ability to program the offline operator prompt for the field. If the format is intended for online use only, the PT tag shouldn't be used.

If the prompt expression given is NULL (i.e. PT = ""), during Batch Entry no prompt or field contents will be displayed to the operator. Normally all fields within a format are treated as prompted and the current data will be displayed and can be changed from the keyboard.

If prompt is not specified (or tag given without an expression), the printer will default to the following:

"Field name?"         the actual name of the field is displayed

Input Device
   *Syntax:* DV = R/K/S/H/D/B
   *Options:* Reserved Data, Keypad, Scanner, Host port,
            Data Base or Batch Constant Data Data for a field can be input from any one of the following sources:

Reserved Data
> No data input is required from the operator. All of the data must be in the Reserved Data (RD tag), Template Data (TD tag) string or derived from copy fields.

Keypad
> This is the default input source. The normal keypad which is installed on the printer.
>
> The actual formatting and display of the information is printer specific since multiple hardware devices may be involved.

Scanner
> Input will come from the scanner. All scanner specific information is stripped from the data sent by the scanner. Only "raw" bar code or OCR data (including any bar code specific data like start/stop characters) will be included in the field content.

Host-port
> Input is sent through the online interface. Refer to the ND tag in the control message packet to specify data in this fashion.

Data Base
Batch Constant Data
> These expressions are for HOST use only. They are not supported by the printer. See PLATFORM documentation for its meaning.

For Scanner and Host input, data can alternately be entered through the keyboard if the printer has that capability.

If the specified device is not available and *Attention Mode* is ON, a warning will be displayed to the operator.

Scanner Bar Code Symbol
  *Syntax:* SS = "string"
  *Options:* "UPCA", "UPCE", etc When data for a field is entered by the scanner (i.e. the DV = S tag expression is given), the printer needs to know what bar code is acceptable. The following string expressions are supported to select the bar code being scanned:

| | | |
|---|---|---|
| UPCA | UPCA+2 | UPCA+5 |
| UPCE | UPCE+2 | UPCE-5 |
| EAN8 | EAN8+2 | EAN8-5 |
| EAN13 | EAN13+2 | EAN13-5 |
| I2of5 | CODE39 | NW7 |
| CODE128 | MSI | CODE16K |
| CODE49 | ANY | |

If any other code besides the one programmed is entered or if the scanned code's check digit is invalid, the printer will inform the operator and the data will be ignored.

If scanner symbol is not specified (or tag given without an expression), the printer will default "UPCA" as the only legal code that can be scanned.

Data Entry Length
*Syntax:* DL = F/V/O
*Options:* Fixed, Variable or Optional Fixed This tag gives the ability to limit the amount of data that can be entered for the field. It qualifies the use of the field length tags given later (FN and FX). Three options are available:

Fixed
> Fixed length fields must contain the exact number of characters specified by the FN tag expression. The FX tag shouldn't be given at all or should specify the same length as FN.

Variable
> Variable length fields can contain any amount of data. The only restrictions are those imposed by the FN and FX tag expressions.
>
> This is the default mode of operation if the DL tag is not given (or given without an expression).

Optional Fixed
> An optional fixed field is one which will accept an empty string or a fixed length string.

Template Data
*Syntax:* TD = "string"
*Options:* 1 to 200 characters

The template data defines a data type for each character in the data string. Characters in the template are mapped in order with characters in the data string to define what input is allowable on a per character basis.

The following template characters exist:

| Template Character | Use or Definition |
| --- | --- |
| * | Any printable character is valid |
| # | Only digits [0..9] are valid |
| @ | Any alpha character is valid [A..Z or a..z] |
| _ | No input accepted (reserved data only) |
| c̄ | Check Digit position |
| all other printable chars | not allowed |

If template data is not specified (or tag given without an expression), the printer will default to the empty string (no template defined by the field).

> NOTE:
> Changing the order of this tag with respect to other data formatting tags will cause different results because functions completed earlier may be used to create the data for the current operation.

Reserved Data
*Syntax:* RD = "string"
*Options:* 1 to 200 characters

The Reserved Data tag is a convenient method of entering "constant" data to be printed with every batch for text and bar code fields. The data is stored as part of the format itself.

If reserved data is not specified (or tag given without an expression), the printer will default to the empty string (no data defined by the field).

Allowable Input
*Syntax:* AI = "string"
*Options:* 1 to 200 characters

The allowable input data defines a data type for the entire data string. Every character in the data string must fall within the set of allowable characters defined by the AI tag.

For example:

"0123456789ABCDEF"     - Hexadecimal digits only allowed
    "$./0123456789"     - Only price information allowed If allowable input data is not specified (or tag given without an expression), the printer will default to the empty string (no input restriction will be defined by the field).

NOTE:
> Changing the order of this tag with respect to other data formatting tags will cause different results because functions completed earlier may be used to create the data for the current operation

Type Restrictions
*Syntax:* TR = n
*Options:* 0 to 6

The type restriction, like allowable input above, establishes what input will be accepted for each character of the data string. There are three types of data classified in this manner:

*Numeric*
    Numeric characters; 0 through 9.
*Alpha*
    Either lower or upper case alphabetic characters. [A..Z, a..z]
*Symbol*
    Symbols are all characters from 0x20 to 0x7E except for numeric and alpha characters defined above.

The expression specifies exactly which of the above types of data can be included in the field. The expression has the following legal values:

0 = Unrestricted      4 = Alphanumeric
    1 = Numeric      5 = Numeric & Symbols
    2 = Alpha      6 = Alpha & Symbols
    3 = Symbols If type restriction is not specified (or tag given without an expression), the printer will default to 0 (unrestricted field).

Field's Minimum Length
  *Syntax:* FN = nnn
  *Options:* 0 to 200

The FN tag is used when a field requires a minimum amount of data to be considered valid and/or in conjunction with the DL tag mentioned earlier.

The value given determines the minimum number of characters that can be entered into the field. If insufficient data is entered, the batch will not be printed.

If the field's minimum length is not specified (or tag given without an expression), the printer will default to 0. No minimum number of characters will be enforced.

Field's Maximum Length
  *Syntax:* FX = nnn
  *Options:* 1 to 200

The FX tag is used when a field must restrict the maximum amount of data to be considered valid and/or in conjunction with the DL tag mentioned earlier.

The value given determines the maximum number of characters that can be entered into the field. This includes any data added to the field by the printer during its data formatting. If too much data is entered, and error will result and the batch will not be printed.

If the field's maximum length is not specified (or tag given without an expression), the printer will default to 200. No maximum number of character limit will be enforced.

> NOTE:
> The value given in the FX tag should be as accurate as possible to minimize the amount of wasted memory within the printer.

Field's Justification
  *Syntax:* FJ = L/C/R
  *Options:* Left, Center or Right The placement of the data within a field can be programmed by the FJ or Field Justificaiton tag. The field is defined by the reference point, horizontal (HR tag) and vertical (VR tag) position, its maximum length (FX tag) and its orientation (FR tag). Within this area, the data can be aligned in one of three ways:

Left
  No justification is performed with the lower-left corner of the field being the field's reference point.

This is the default mode if field justification is not specified (or tag given without an expression).

Center
  The field's content is centered within the area defined for the field.

Right
  Right justification moves the data within the field to the rightmost positions defined for the field.

Justification does not change the reference point with respect to rotation. Field rotation will always occur about the lower-left corner of the field no matter how it is justified.

Pad Character
  *Syntax:* PC = "string"
  *Options:* 1 character

If a pad character is given and the field is fixed length (specified by the DL tag), the data string will be filled with the pad character to the maximum length given.

The pad character tag and its expression are required to select padding. If the tag is not specified, no padding will occur.

> NOTE:
>> This tag defines the beginning of the pad character sequence for the current field. It must precede the PD tag if given.

This character position is the first extracted to the destination string.

If copy start position is not specified (or tag given without an expression), the printer will default to 1.

> NOTE:
>> This tag can be repeated in the same field with each occurrence preceded by the CN tag to select another source field.
>>
>> Changing the order of this tag with respect to other data formatting tags will cause different results because functions completed earlier may be used to create the data for the current operation.

Copy Destination Position
  *Syntax:* CD = nnn
  *Options:* 1 to 200 (column to place data into)

For copy fields, the destination string's character position can be selected. This character position is the first to receive the extracted data from the source field.

If copy destination position is not specified (or tag given without an expression), the printer will default to 1.

> NOTE:
>> This tag can be repeated in the same field with each occurrence preceded by the CN tag to select another source field.
>>
>> Changing the order of this tag with respect to other data formatting tags will cause different results because functions completed earlier may be used to create the data for the current operation.

Copy Length
  *Syntax:* CL = nnn
  *Options:* 1 to 200

For copy fields, the number of characters extracted from the source field can be selected. If the destination field is overfilled, an error will result.

If copy length is not specified (or tag given without an expression), the printer will default to copy until the end of the source field.

> NOTE:
>
> This tag can be repeated in the same field with each occurrence preceded by the CN tag to select another source field.
>
> Changing the order of this tag with respect to other data formatting tags will cause different results because functions completed earlier may be used to create the data for the current operation.

Inter-ticket Formatting
*Syntax:* IF = B/A
*Options:* Before or After formatting For copy fields, the copy can occur before or after data formatting has been applied to the source field.

Before formatting will give the "raw" data input by the operator or batch. No data formatting features (refer to section 5.1.2) have been performed on the data received.

After formatting uses the string produced after applying all data formatting for all previous fields in the format.

If inter-ticket formatting is not specified (or tag given without an expression), the printer will default to before formatting.

> NOTE:
>
> This tag can be repeated in the same field with each occurrence preceded by the CN tag to select another source field.
>
> Changing the order of this tag with respect to other data formatting tags will cause different results because functions completed earlier may be used to create the data for the current operation Check Digit Verify mode
*Syntax:* CV = G/V
*Options:* Generate or Verify CD User defined check digits can be either generated by the printer or will be verified for the field. The CV tag is required to select the CD mode.

All CDs that are required to produce a scannable bar code are generated automatically. The printer will not generate a bar code with an invalid check digit.

The CD verify tag and its expression are required to select the user definable check digit function. If the tag is not specified, no CD operation will be performed.

> NOTE:
>
> This tag defines the beginning of the check digit sequence for the current field. It must precede the CA, MD and CW tags if given.
>
> Changing the order of this tag with respect to other data formatting tags will cause different results because functions completed earlier may be used to create the data for the current operation Check Digit Algorithm
   *Syntax:* CA = "nn:name"
   *Options:* 1 to 15 characters Check digits can be generated using either the scheme specified in the format or using a predefined scheme in the Check Digit Table. The CA tag selects between these two possibilities.

If "nn:" is zero (i.e. CA = "0:algorithm") the CD scheme is defined within the format. When "nn:" is between 01 and 10, the numbered CD scheme is selected from the Check Digit Table. The later doesn't require an algorithm to be specified.

> *Using CD scheme within the format:*
>> The expression must give a CD scheme specification to select which algorithm will be used. Any of the following algorithms is available:
>>
>> "Sum of digits"          NOTE: Strings are case
>> "Sum of products"              sensitive.
>> "AIS-A", "SBC-A", "AIS-B", "SBC-B"
>> "ISBN" or "MOD43"
>>
>> For example:
>>    CA = "0:Sum of digits"

> *Using the Check Digit Table:*
>> If the expression selects an entry from the Check Digit Table that scheme will be used to generate or verify the check digit.
>>
>> The Check Digit Table supports up to 10 unique schemes.

If the CD algorithm tag is not specified (or tag given without an expression), the printer will default to "Sum of digits" (implies the use of a format specific CD scheme).

> NOTE:
>> Changing the order of this tag with respect to other data formatting tags will cause different results because functions completed earlier may be used to create the data for the current operation.

Check Digit Modulus
   *Syntax:* MD = nn
   *Options:* 2 <= nn <= 11

The CD modulus tag follows the CV tag to define the modulus for the current check digit scheme. Its value is from 2 to 11.

If the CD modulus tag is not specified (or tag given without an expression), the printer will default to 10.

> NOTE:
>> Changing the order of this tag with respect to other data formatting tags will cause different results because functions completed earlier may be used to create the data for the current operation Normally the CD algorithm will produce an "X" CD character for a value of 10 when using modulus 11.

Check Digit Weights
Syntax: CW = "[+/-]nn, [+/-]nn, ..."
Options: +/- 1 to 99

The CD weight tag follows the CV tag to define the character weights for the current check digit scheme. Each value in the string defines the signed numerical weight for the corresponding character position of the source string.

If an insufficient number of weights are given to match each source digit, the weight string will be expanded by replicating the string given until a sufficient number of weights is achieved.

A comma, space or combination of the two character(s) can be used to separate the individual weights.

If the CD weight tag is not specified (or tag given without an expression), the printer will default to "1,2,1,2..."

> NOTE:
> Changing the order of this tag with respect to other data formatting tags will cause different results because functions completed earlier may be used to create the data for the current operation.

Cost Code Name
Syntax: CT = "name"
Options: 1 to 12 characters

User defined cost codes which have been downloaded into the printer's Cost Code Translation Table, can be generated by the printer. The CT tag is required to select this feature.

The "name" expression is the same name given to the translation message packet which was sent earlier to the printer.

If the cost code name tag is not specified (or tag given without an expression), the printer will not translate the data.

> NOTE:
> Both CT and CC tags cannot be specified for the same field. Doing so will result in an error.
>
> Changing the order of this tag with respect to other data formatting tags will cause different results because functions completed earlier may be used to create the data for the current operation

Cost Code Conversion String
Syntax: CC = "cc..."
Options: 2 to 80 characters User definable cost code strings can be supplied along with the field itself by using the CC tag.

The "cc..." expression gives a *paired character* specification for the initial character and result character respectively. With 200 character strings, this gives the ability to define from one to 100 conversion characters for each field.

Any character encountered in the initial string that doesn't have a corresponding result character will remain untranslated. No error will result.

If the cost code string tag is not specified (or tag given without an expression), the printer will not translate the data.

> NOTE:
>
> Both CT and CC tags cannot be specified for the same field. Doing so will result in an error.
>
> Changing the order of this tag with respect to other data formatting tags will cause different results because functions completed earlier may be used to create the data for the current operation

Increment/Decrement Field
*Syntax:* ID = [+/-]nnnn
*Options:* -9999 to +9999

The printer has the ability to automatically increment or decrement the content of a field between each set of tags (refer to the PM tag to determine the control over printing sets of tickets). The ID tag is required to activate this feature.

The expression given specifies the signed value that will be added to or deducted from the field content. Its range is from -9999 to -9999.

If the incremented/decremented value doesn't fit in the string specified, if it increments out-of-range or the string positions to be incremented contain non-numerics, a warning will be displayed by the printer. The ticket will still be printed.

If the increment/decrement tag is not specified (or tag given without an expression), the printer will not modify the data between sets of tickets.

> NOTE:
>
> This tag defines the beginning of the increment/decrement feature sequence for the current field. It must precede the IR tag if given
>
> Changing the order of this tag with respect to other data formatting tags will cause different results because functions completed earlier may be used to create the data for the current operation.

Increment/Decrement Range
*Syntax:* IR = "nnn,nnn"
*Options:* nnn for length of nnn (1 to 200)

Following the required ID tag, the actual character positions that are to be affected by incrementing or decrementing can be specified by the IR tag.

The two numeric values in the string give the starting position followed by the number of characters for the substring that is to be used for the increment/decrement operation Both values (starting character position and substring length) must be in the range from 1 to 200. Both values are required in the string expression; neither can be omitted.

If the increment/decrement range tag is not specified (or tag given without an expression), the printer will default to "1,200". The entire content of the field will be incremented or decremented.

> NOTE:
> Changing the order of this tag with respect to other data formatting tags will cause different results because functions completed earlier may be used to create the data for the current operation.

4.1.5 Field Contents: *Text fields only*

The *Text field only expression* tags normally follow the Text and Bar Code Standard Arguments when defining a text field. The tags in this group can only be used to qualify the text field and its formatting.

Font Style
  *Syntax:* FS = "name"
  *Options:* 0 to 12 characters

The font style tag actually selects the printer font that will be used to image the field's data on the ticket. The tag is required to specify a text field or null for Data Fields. It must immediately follow the FN tag for the field that is being defined.

There are four Resident Fonts that are supported in every PROTALK implementation. Their name strings follow:

"Standard"   "HR1"        NOTE: Font selection strings
"Reduced"    "HR2"        are case sensitive.
"Bold"
"OCRA"

In addition to the above, a printer may have downloaded fonts, fonts on smart cards, etc. Each of these fonts are identified by name and can be selected by giving that name in the FS tag. However, for the format to be portable to different printers, the same fonts must be loaded in each system. Format incompatibility may result if a low end printer doesn't support font download.

If the font style tag is given without an expression, the printer will default to "Standard".

Vertical Magnification
  *Syntax:* VM = d.dd
  *Options:* 1 to 10.0

The vertical or y-axis dimension of the field can be magnified by up to 10 times its original size with the VM tag.

The resulting size of the field will be font specific. Depending on the font selected, magnification will be applied to the *normal* size (defined when the font was created) of the font. The entire font cell is magnified including white space.

The d.dd expression will be rounded to the magnification resolution supported by the font. For example, if the font only supports magnifications of 1, 2, 5 and 10, a value of 3 will produce a magnification of 2. The resident fonts (documented in the FS tag description), can be vertically magnified by 1, 2, 3, 4, 5, 6, 7, 8, 9 or 10 times.

If vertical magnification is not specified (or tag given without an expression), the printer will default to 1. The font selected will be in its normal height.

Horizontal Magnification
*Syntax:* HM = d.dd
*Options:* 1 to 10.0

The horizontal or x-axis dimension of the field can be magnified by up to 10 times its original size with the HM tag.

The resulting size of the field will be font specific. Depending on the font selected, magnification will be applied to the *normal* size (defined when the font was created) of the font. The entire font cell is magnified including white space.

The d.dd expression will be rounded to the magnification resolution supported by the font. For example, if the font only supports magnifications of 1, 2, 5 and 10, a value of 3 will produce a magnification of 2. The resident fonts (documented in the FS tag description), can be horizontally magnified by 1, 2, 3, 4, 5, 6, 7, 8, 9 or 10 times.

If horizontal magnification is not specified (or tag given without an expression), the printer will default to 1. The font selected will be in its normal width.

Character Rotation
*Syntax:* CR = nnn
*Options:* 0 to 359 (degrees)

The individual characters within the field can be rotated independent of field rotation (refer to the FR tag).

The amount of rotation is expressed in degrees but may be rounded by the printer to the nearest angle implemented on the printer. It is recommended that fields only be rotated in 90 degree increments. Any PROTALK implemention will support both 0 and 90 degree character rotations. All others may be excluded.

If character rotation is not specified (or tag given without an expression), the printer will default to zero degrees.

Inter-character Gap
*Syntax:* IG = .dd
*Options:* 0 to .50 inches

Additional space may be inserted between characters within a string of data by increasing the font cell's inter-character gap. Either mono-spaced or proportional spaced fonts can have additional inter-character gap applied.

The amount of space is expressed in user units in the expression. Therefore, the value is not font or printer resolution specific. Up to 1/2 inch can be specified.

The inter-character gap IS magnified along with the rest of the data within the field if either VM tags are included for the field.

If inter-character gap is not specified (or tag given without an expression), the printer will default to 0. No additional gap will be inserted between characters.

Color (Black or White)
  *Syntax:* CO = B or W
  *Options:* B or W

Text fields can be printed black on white (CO = B) or white on black (CO = W). The CO tag specifies the foreground color.

If color is not specified (or tag given without an expression), the printer will default to B (black print on white supply).

4.1.6 Field Contents: Bar Code fields only

The *Bar Code field only expression* tags normally follow the Text and Bar Code Standard Arguments when defining a text field. The tags in this group can only be used to qualify the bar code field and its formatting.

Bar Code Type
  *Syntax:* BT = "string"
  *Options:* see below

The bar code tag actually selects the bar code symbology that will be used to image the field's data on the ticket. The tag is required to specify a bar code field. It must immediately follow the FN tag for the field that is being defined.

Nineteen bar code symbologies have been defined. Their name strings follow

"UPCA", "UPCA+2", "UPCA+5"        NOTE: Bar Code selection
"UPCE", "UPCE+2", "UPCE+5"               strings are case
"EAN8", "EAN8+2", "EAN8+5"               sensitive.
"EAN13", "EAN13+2", "EAN13+5"
"I2of5", "CODE39", "NW7"
"CODE128", "CODE128NUM", "MSI",
or "CODE16K"

In addition to the above, a printer may have downloaded bar codes. bar code symbologies on smart cards, etc. Each of these are identified by name and can be selected by giving that name in the BT tag. However, for the format to be portable to different printers, the same bar code symbologies must be loaded in each system. Format incompatibility may result if a low end printer doesn't support bar code download.

If the bar code type tag is given without an expression, the printer will default to "UPCA".

Density
  *Syntax:* DN = nn.nn
  *Options:* 0 to 99.99

A bar code may support many densities (or relationships between spaces and bars)

These different relationships are bar code and printer resolution specific so will vary per printer.

The DN tag gives the ability to approximate the desired bar code by specifying the characters-per-inch (CPI for either English or Dot units) or characters-per centimeter (CPC for Metric units) encoding for the bar code. This gives maximum portability between different systems.

The value given in the tag expression approximates this CPI. The printer will round this value to give the best fit bar code encoding to approximate the CPI density requested If density is not specified (or tag given without an expression), the printer will default to 99.99 (the highest density supported by the printer).

Appearance Code
  *Syntax:* AC = nn
  *Options:* 1 to 12

Human readable characters can be applied to any bar code field. The AC tag selects the format that human readable will be presented in The following formats are supported: (CD stands for Check Digit and NS for Numbering System)

| Designator | Description | |
|---|---|---|
| 1 | No CD or NS | |
| 2 | NS on top, no CD | UPC/EAN only |
| 3 | CD on top, no NS | " |
| 4 | CD and NS on top | " |
| 5 | NS in middle, no CD | " |
| 6 | CD in middle, no NS | " |
| 7 | CD and NS in middle | " |
| 8 | NS at bottom, no CD | " |
| 9 | CD at bottom, no NS | " |
| 10 | CD and NS at bottom | " |
| 11 | No text, image bar code only | |
| 12 | All text, centered below | |

The terminology of the above descriptions assume that the field is not rotated. Human readable characters will be rotated along with the bar code.

The reference point for bar codes is the lower-left hand corner of the field. When the human readable characters are provided with the bar code, they will be printed based on this reference. However, these characters will extend outside of the normal bar code field size.

If appearance code is not specified (or tag given without an expression), the printer will default to 8 (no text will be displayed).

Bar Code Height
  *Syntax:* CH = d.dd
  *Options:* .2" minimum

The height of the unrotated bar code can be specified by the CH tag. The expression specifies this height in user units (inches, centimeters or dots as selected by the UT tag)

The minimum bar code height is .2 inches. If a value is specified less than this or if the height is large enough to force the bar code off the ticket, an error will be generated.

If bar code height is not specified (or tag given without an expression), the printer will default to .5 inches.

4.1.7 Field Contents: Interactive fields only

This section is TBD. It is intended to address RF applications and operator interfacing through host control.

Interactive Key Code
    *Syntax:* IK = "string"
    *Options:* 1 to 80 characters Required
    Returns format string i.e. "Result = %s"

4.1.8 Field Contents: Line fields only

The *Line field only expression* tags normally follow the Standard Arguments when defining a line field. The tags in this group can only be used to qualify the line field and its formatting.

Lines can be specified in one of two methods; 1) start and end points (using the VE and HE tags) or 2) angle and length (LA and LL tags). One but not both of these sequences of tags are required to define the line.

Line Width
    *Syntax:* LW = d.dd
    *Options:* .002 to .50 inches

The line width tag actually selects the line drawing feature. The tag is required to draw a line. It must immediately-follow the FN tag for the field that is being defined.

The expression gives the width of the line expressed in user units (inches, centimeters or dots as programmed by the UT tag). The maximum line width is .5 inches.

Every PROTALK implementation will support vertical and horizontal lines (0 and 90 degree lines). If a line is defined at an angle that is not supported by the printer, an error will result.

If the line width tag is given without an expression, the printer will default to a .10 inch wide line.

Vertical End Reference
    *Syntax:* VE = d.dd
    *Options:* 0 to stock length

The vertical end reference is the y-axis point where the line is to stop. Vertically the line will start at the vertical reference (VR tag) and end at the vertical end reference (VE tag).

The value given is in user units (inches, centimeters or dots), must be different than the vertical reference and must specify a coordinate on the defined ticket or an error will result.

If the LA/LL tags are not used to define the line, the VE/HE sequence is required.

Horizontal End Reference
*Syntax:* HE = d.dd
*Options:* 0 to stock width

The horizontal end reference is the x-axis point where the line is to stop. Horizontally the line will start at the horizontal reference (HR tag) and end at the horizontal end reference (HE tag).

The value given is in user units (inches, centimeters or dots), must be different than the horizontal reference and must specify a coordinate on the defined ticket. The angle defined by the start and stop references must be supported by the printer or an error will result.

If the LA/LL tags are not used to define the line, the VE/HE sequence is required.

Line Angle
*Syntax:* LA = nnn
*Options:* 0 to 359 (degrees)

The angle of a line is defined from the horizontal or x-axis and rotates in a positive direction counterclockwise. This angle defines the direction that the line will be drawn starting from the vertical and horizontal reference point.

The value given is in degrees. The angle defined must be supported by the printer or an error will result.

If the VE/HE tags are not used to define the line, the LA/LL sequence is required.

Line Length
*Syntax:* LL = d.dd
*Options:* 0 to stock limit

The length of a line is defined by the LL tag in user units (inches, centimeters or dots as specified by the UT tag) and must specify a coordinate on the defined ticket.

If the VE/HE tags are not used to define the line, the LA/LL sequence is required.

4.1.9 Field Contents: *Box fields only*

The *Box field only expression* tags normally follow the Standard Arguments when defining a box field. The tags in this group can only be used to qualify the box field and its formatting.

The only box supported is parallel to the vertical and horizontal axes. No rotated boxes are available, however they could be created with the line drawing package.

Box's Line Width
Syntax: BW = d.dd
Options: .002 to .50 inches

The box width tag actually selects the box drawing feature. The tag is required to draw a box. It must immediately follow the FN tag for the field that is being defined.

The expression gives the width of each line of the box and is expressed in user units (inches, centimeters or dots as programmed by the UT tag). The maximum line width is .5 inches.

If the box width tag is given without an expression, the printer will default to a .10 inch wide line.

Vertical End Reference
Syntax: VE = d.dd
Options: 0 to stock length

The box's vertical end reference is the y-axis point of the upper-right hand corner of the box. Vertically the box's lower-left hand corner is at the vertical reference (VR tag).

The value given is in user units (inches, centimeters or dots), must be different than the vertical reference and must specify a coordinate on the defined ticket.

The VE tag is required to draw a box.

Horizontal End Reference
Syntax: HE = d.dd
Options: 0 to stock width

The box's horizontal end reference is the x-axis point of the upper-right hand corner of the box. Horizontally the box's lower-left hand corner is at the horizontal reference (HR tag).

The value given is in user units (inches, centimeters or dots), must be different than the horizontal reference and must specify a coordinate on the defined ticket.

The HE tag is required to draw a box.

4.1.10 Field Contents: *Graphic fields only*

The *Graphic field only expression* tags normally follow the Standard Arguments when defining a graphic field. The tags in this group can only be used to qualify the graphic field and its formatting.

Graphic
Syntax: GR = "name"
Options: 1 to 12 characters

The graphic tag actually selects the graphic imaging feature. The tag is required to print a format based graphic. It must immediately follow the FN tag for the field that is being defined.

The name given must match the one specified in the graphic message packet. Prior to printing a batch using a format that contains a graphic, the graphic message packet must be downloaded into the printer.

Using graphics in this manner, verses loading them directly into the image buffer, has the benefit that the graphic will always get printed. However, the entire graphic must be small enough to fit into available printer memory.

If the graphic tag is given without an expression, the printer will select the last graphic loaded as the one to be imaged.

4.2 Batch Definition

The batch consists of a Batch Header followed by from 0 to 99 Named Data tags. The batch message packet qualifies the Standard Output Descriptions that may or may not be part of the format as well as gives the data for each field in the format.

The Standard Output Descriptions are identical to and will override those given in the format definition. This gives the programmer some control of the printer's options without having to transmit the format to select and deselect those options on a batch basis. If a tag in this group is not specified in either the format or batch, its default value will be used.

Data should be given for each field in the format. If it is not given for a field that requires data input, the data from the most recent batch using the same format will be substituted. However, this feature may give different results depending on the number of batches printed and the printer configuration itself.

For example, a list of batches, using the same format with a field only given data on the first batch, may print differently if other batches, using different formats, are sent intermixed with the original list of batches. The printer may not be able to hold this much information and delete the earlier batches which it was to copy from. Refer to Batch Binding to correct most of these sequencing problems.

4.2.1 Batch Header

Batch Name
*Syntax:* BH = "name"
*Options:* 1 to 12 characters

The Batch Name identifies the batch. The tag itself is required to identify the message packet but the tag expression is optional. If the expression is omitted or a NULL string is given, the printer will automatically name the batch as follows:

"AUTOnnnn"   where: $0 <= nnn <= 9999$   (leading zeros included)

Offline autonaming of batches should follow a different naming convention.

Disposition

The disposition tag of a batch differs slightly from all the other message packets. An additional option is available to cause the printer to both load and print the batch.

Print
> The Print disposition specifies that the packet is to be loaded into the printer and queued for printing. This is the default mode of operation for batch packets.

Alternate Device
Refer to FORMAT Documentation for description

Format Name
Refer to FORMAT Documentation for description

Batch Binding (Bind to named batch)
Syntax: BB = "name"
Options: 1 to 12 characters Batch Binding gives the capability of grouping multiple batches together. This gives the programmer control over the order that the printer prints individual batches. The batches may all reference the same format or different formats. The only requirement is that all formats and batches are stored concurrently inside the printer.

The batch name provided in the tag expression gives the name for the NEXT batch in the list. The printer holds all batches in the bound list until a batch without the BB tag is encountered to terminate the list. The batches are then printed in order.

If batches are received while processing the bound list which are not part of the list, they will actually be scheduled to print before the bound list.

In order to use Batch Binding, it is required that all batches be named. The printer's autonaming feature shouldn't be used.

If Batch Binding is not specified (or tag given without an expression), the current batch list is terminated and the batches are scheduled for printing. If the batch isn't part of the current list, the list remains unaffected.

Ribbon Saver
Syntax: RS = E/D
Options: Enable or Disable

With the ribbon saver option enabled, the printer will automatically retract the ribbon whenever it determines that it can do so and save ribbon. The actual implementation is printer specific since it is dependent on hardware, print speed as well as what data is being printed.

If the ribbon saver hardware is not available and *Attention Mode* is ON, a warning will be displayed to the operator.

If Ribbon Saver is not specified (or tag given without an expression), the ribbon saver option will be disabled.

Batch Priority
   *Syntax:* BP = n
   *Options:* 1 (highest) to 9 (lowest)

Batches can be prioritized to categorize print order. After the currently printing batch completes, the batch with the highest priority will be printed next. Batches at the same priority level are printed in the order received.

Priority 1 batches will print first followed by priority 2, 3, and so on.

Priority CANNOT override a bound batch list. Once a bound list begins to print, all batches in the list must be printed or cancelled before a batch not in the list will be started. The initial priority of a bound list will be determined by the priority of the first batch received in the list.

If Batch Priority is not specified (or tag given without an expression), the lowest batch priority will be used (level 9).

Spoiled Count
   *Syntax:* SC = nnnn
   *Options:* 0 to 9999

The Spoil Count tag is for upload purpose only. It will be ignored if received by the printer without producing a warning or error message.

It indicates the actual number of tags printed the last time that batch was submitted for printing. The value returned will be zero if the batch is in the print queue or the batch has been loaded but never printed.

4.2.2 Standard Output Descriptions
Refer to FORMAT Documentation for description

4.2.3 Text and Bar Code Data

Named Field Data
   *Syntax:* ND = "name, string"
   *Options:* 12 character name and 200 character data The Named Data tag gives the actual data to be printed for the field named by the tag. Data can be supplied for both text and bar code fields. No other field can have associated data. To give data to a field that cannot accept it will result in a warning if *Attention Mode* is ON.

> NOTE:
> This tag is the only tag defined in PROTALK that can accept a single string greater that 200 characters in length If an ND tag is not supplied for a field, the data for that field will be retrieved from the most recent batch printed using the same format. If a previous batch doesn't exist in the printer, the data will be NULL.

The comma is required in the string expression if data is given. All of the following are legal.

| | Field Name | Data String |
|---|---|---|
| ND = "field 1,data" | field 1 | data |
| | | (spaces in field name are significant) |
| ND = "field4" | field4 | (null string) |
| | | (optional comma) |

4.3 Graphic Definition

Graphic images are produced on a host and formatted so they can be interpreted by the printer. There are two modes of graphic operation, as follows:

*Immediate Graphic Load:*
By selecting the Temporary device of the AD tag, the graphic can be immediately placed in the image buffer and associated with the next batch printed. In fact, the graphic will be printed on every batch that follows using the same format.

The only time a graphic can be loaded immediately is when the printer's batch queue is empty.

The immediate graphic data is not saved by the printer. Once loaded and placed into the image buffer, the data is removed and therefore cannot be referenced by formats.

*Stored Graphic:*
A stored graphic is loaded into RAM and stays resident until deleted or lost (if the printer doesn't maintain graphics after power-down). This type of graphic must be uniquely named and then referenced by a format.

In this case, the graphic will always appear with the printed batch no matter what the sequencing of batches is. The draw-back is that memory is used to store the graphic internal to the printer. Normally this will reduce the number of formats and/or batches that the printer can accept.

> NOTE:
> PROTALK does not offer a graphic modify option. The entire graphic must be downloaded in a single message packet every time it changes.

4.3.1 Graphic Data

Graphic Name
*Syntax:* GR = "name"
*Options:* 1 to 12 characters

The Graphic Name uniquely identifies the graphic. The tag itself is required to identify the message packet but the tag expression is optional. If the graphic is loaded directly into the image buffer, the name may be omitted. Otherwise it is required and must be unique so it can be referenced by a format.

The name given must match the one specified in the format. The actual graphic name in the format is identical to the GR tag of the graphic message packet which lays out the data.

Disposition
  Refer to FORMAT Documentation for description

Alternate Device
  The alternate device tag of a graphic differs slightly from all the other message packets. If the Temporary device is specified, the graphic will be loaded immediately into the image buffer and used for the next batch received.

All other selections are the same as those listed under the Format Header documentation.

Units
  Refer to FORMAT Documentation for description

Vertical Reference
  Refer to FORMAT Documentation for description

NOTE:
  This value is only needed if the graphic is being loaded directly into the image buffer. An error will result if the reference is used on a stored graphic.

Horizontal Reference
  Refer to FORMAT Documentation for description

NOTE:
  This value is only needed if the graphic is being loaded directly into the image buffer. An error will result if the reference is used on a stored graphic.

The reference point for graphics is the lower-left corner of the image.

Graphic Encoding
  *Syntax:* GE = H/R
  *Options:* Hex or Run-length

This tag defines the encoding scheme for the succeeding set of Graphic Data tags. If the tag is not specified (or tag given without an expression), Run-length encoding will be assumed.

Unpredictable results will occur if the scheme selected (or default) is in effect that conflicts with the actual data encoding given in the GD tag sequence(s).

Graphic Data

What is claimed and desired to be secured by Letters Patent is:

1. A barcode identification system including at least one barcode printer for printing on a web of record members, said system having an associated system key with a unique identification associated therewith comprising:
   input means actuable by a user for entering printing information;
   processing means responsive to said input means for generating barcode identification information to be transmitted to said barcode printer, said processing means operating in accordance with a plurality of software modules each of which requires initialization prior to operation;
   means responsive to the initialization of each software module for determining whether said software module includes a key identification that matches said system key identification; and
   means for limiting the operation of said software module if said determining means determines that said software module does not include a key that matches said system key identification.

2. A barcode identification system as recited in claim 1 wherein said limiting means limits the time that the software module can operate.

3. A barcode identification system as recited in claim 2 wherein said limiting means limits the time between successive initializations of a software module.

4. A barcode identification system as recited in claim 1 wherein said system key is removable and including means for periodically determining whether said system key has been removed; and means for terminating the operation of all software modules if said periodic determining means determines that said system key has been removed.

5. A barcode identification system as recited in claim including means coupled to said processing for displaying information to said user, said processing means, operating in accordance with one of said modules, controlling said display means to display a data entry template to said user, said displayed data entry template including a fixed number of single character input positions, each of said input positions having an associated, individual restriction as to the type of character that is valid for said position and said displayed template depicting the restriction associated with each of said input positions to aid the user in entering valid data for printing on a web of record members.

6. A barcode identification system as recited in claim 5 wherein at least one single character capable of being printed by said barcode printer requires the input of a plurality of characters to define said one character, said bar code identification system being responsive to a predetermined symbol entered by said user actuated input means to automatically adjust the length of said displayed template to prompt the user to enter said plurality of characters defining said one character.

7. A barcode identification system as recited in claim 5 wherein each restriction is encoded so as to be represented by one character, prior to data entry said template depicting in each template input position the character representing the restriction associated with that input position, said processor in accordance with said one module replacing each encoded character with a user entered character as said characters are entered.

8. A barcode identification system as recited in claim 1 wherein said barcode printer prints data in a plurality of fields on a record member, said barcode identification system including a database for storing data for a plurality of fields, each field of data having an associated database search term; means responsive to a search term entered by a user via said input means for looking up said field data associated with said term and means for displaying said field data for user verification prior to being transmitted to said barcode printer for printing.

9. A barcode identification system as recited in claim 1 including means for detecting an error in the operation of said system; and means for storing a record of said error including the identity of the software module in which said error occurred, information indicating the severity of said error, and the location in said software module at which the error occurred.

10. A barcode identification system including at least one barcode printer for printing on a web of record members comprising;
   input means actuable by a user for entering printing information;
   processing means responsive to said input means for generating barcode identification information to be transmitted to said barcode printer, said processing means operating in accordance with a plurality of software modules including a module for prompting the entry of printing information;
   means for displaying information, said processing means controlling said display means in accordance with said prompting moduleto display a data entry template including a fixed number of single character input positions, each of said input positions having an associated, individual restriction as to the type of character that is valid for said position and said displayed template depicting the restriction associated with each of said input positions to aid the user in entering valid data for printing on a web of record members.

11. A barcode identification system as recited in claim 10 including a system key having a unique identification, said system key being removably coupled to said processing means to enable said processing means to detect said key identification.

12. A barcode identification system as recited in claim 11 wherein each of said modules requires initialization prior to operation, said system including means responsive to the initialization of each software module for determining whether said software module includes a key identification that matches said system key identification; and
   means for limiting the operation of said software module if said determining means determines that said software module does not include a key that matches said system key identification.

13. A barcode identification system as recited in claim 12 wherein said limiting means limits the time that the software module can operate.

14. A barcode identification system as recited in claim 12 wherein said limiting means limits the time between successive initializations of a software module.

15. A barcode identification system as recited in claim including means for periodically determining whether said system key has bee removed; and means for terminating the operation of all software modules if said periodic determining means determines that said system key has been removed.

16. A barcode identification system as recited in claim 10 wherein at least one single character capable of being printed by said barcode printer requires the input of a plurality of characters to define said one character, said bar code identification system being responsive to a predetermined symbol entered by said user actuated input means to automatically adjust the length of said displayed template to prompt the user to enter said plurality of characters defining said one character.

17. A barcode identification system as recited in claim 10 wherein each restriction is encoded so as to be represented by one character, prior to data entry said template depicting in each template input position the character representing the restriction associated with that input position, said processor in accordance with said one module replacing each encoded character with a user entered character as said characters are entered.

18. A barcode identification system as recited in claim 10 wherein said barcode printer prints data in a plurality of fields on a record member, said barcode identification system including a database for storing data for a plurality of fields, each field of data having an associated database search term; means responsive to a search term entered by a user via said input means for looking up said field data associated with said term and means for displaying said field data for user verification prior to being transmitted to said barcode printer for printing.

19. A barcode identification system as recited in claim 10 including means for detecting an error in the operation of said system; and means for storing a record of said error including the identity of the software module in which said error occurred, information indicating the severity of said error, and the location in said software module at which the error occurred.

* * * * *

UNITED STATES PATENT AND TRADEMARK OFFICE
CERTIFICATE OF CORRECTION

PATENT NO. : 5,227,643
DATED : July 13, 1993
INVENTOR(S) : Craig et al.

It is certified that error appears in the above-indentified patent and that said Letters Patent is hereby corrected as shown below:

Column 7, line 3 - after "error" insert --.--;

Column 13, line 28 - change "Whether" to --whether--;

Column 13, line 32 - change "a" to --at--;

Column 17, line 3 - after "474" insert --.--;

Column 87, Claim 5, line 1 - after "claim" insert --1--;

Column 88, Claim 15, line 1 - after "claim" insert --11--;

Column 88, Claim 15, line 3 - change "bee" to --been--.

Signed and Sealed this

Tenth Day of May, 1994

Attest:

BRUCE LEHMAN

*Attesting Officer*     *Commissioner of Patents and Trademarks*